United States Patent
Lim et al.

(10) Patent No.: US 10,299,181 B2
(45) Date of Patent: May 21, 2019

(54) METHOD AND APPARATUS FOR CONFIGURING DISCONNECTED TCP CONNECTION IN COMMUNICATION SYSTEM, HANDOVER SUPPORT METHOD AND APPARATUS THEREFOR

(71) Applicant: Samsung Electronics Co., Ltd., Gyeonggi-do (KR)

(72) Inventors: Han-Na Lim, Seoul (KR); Jung-Shin Park, Seoul (KR); Joo-Hyung Lee, Bucheon-si (KR); Jin-Sung Lee, Seoul (KR); Hyung-Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/532,459

(22) PCT Filed: Dec. 1, 2015

(86) PCT No.: PCT/KR2015/012981
§ 371 (c)(1),
(2) Date: Jun. 1, 2017

(87) PCT Pub. No.: WO2016/089082
PCT Pub. Date: Jun. 9, 2016

(65) Prior Publication Data
US 2017/0273126 A1 Sep. 21, 2017

(30) Foreign Application Priority Data

Dec. 1, 2014 (KR) ........................ 10-2014-0170058

(51) Int. Cl.
*H04W 36/08* (2009.01)
*H04W 36/02* (2009.01)
(Continued)

(52) U.S. Cl.
CPC ....... *H04W 36/08* (2013.01); *H04W 28/0273* (2013.01); *H04W 36/02* (2013.01);
(Continued)

(58) Field of Classification Search
None
See application file for complete search history.

(56) References Cited

U.S. PATENT DOCUMENTS

| 7,616,644 B2 | 11/2009 | Chaskar et al. |
| 8,024,478 B2 | 9/2011 | Patel |

(Continued)

FOREIGN PATENT DOCUMENTS

| EP | 2953310 A1 | 12/2015 |
| KR | 1020060123974 A | 12/2006 |

(Continued)

OTHER PUBLICATIONS

International Search Report dated Mar. 4, 2016 in connection with International Patent Application No. PCT/KR2015/012981.

(Continued)

*Primary Examiner* — James P Duffy

(57) ABSTRACT

The present disclosure relates to a 5G or pre-5G communication system that is provided so as to support higher data transmission rates after 4G communication systems such as LTE. In addition, the present disclosure relates to a method and an apparatus for configuring a disconnected TCP connection in a communication system, and a handover support method and apparatus therefor. The method for a TCP proxy configuring a TCP connection in a communication system according to the present disclosure comprises the steps of: configuring a tunnel for receiving/transmitting data with a base station; and according to a TCP connection request by a terminal, configuring a first TCP connection between the terminal and the TCP proxy, and configuring a second TCP (Continued)

connection between the TCP proxy and a service server of an IP network.

16 Claims, 23 Drawing Sheets

(51) Int. Cl.
| | |
|---|---|
| *H04W 80/06* | (2009.01) |
| *H04W 88/14* | (2009.01) |
| *H04W 28/02* | (2009.01) |
| *H04W 76/12* | (2018.01) |
| *H04W 76/10* | (2018.01) |
| *H04W 88/02* | (2009.01) |
| *H04L 12/801* | (2013.01) |
| *H04W 36/00* | (2009.01) |

(52) U.S. Cl.
CPC ......... *H04W 36/023* (2013.01); *H04W 76/10* (2018.02); *H04W 76/12* (2018.02); *H04W 80/06* (2013.01); *H04W 88/14* (2013.01); H04L 47/193 (2013.01); H04W 28/0278 (2013.01); H04W 36/0011 (2013.01); H04W 88/02 (2013.01)

(56) References Cited

U.S. PATENT DOCUMENTS

| | | | |
|---|---|---|---|
| 8,050,186 B2 | 11/2011 | Backman | |
| 2006/0007934 A1 | 1/2006 | Chemiakina et al. | |
| 2006/0268907 A1 | 11/2006 | Lee et al. | |
| 2008/0076441 A1* | 3/2008 | Zhou | H04W 36/26 455/452.2 |
| 2008/0117836 A1* | 5/2008 | Savoor | H04L 41/0896 370/254 |
| 2009/0207773 A1* | 8/2009 | Feng | H04L 41/5022 370/312 |
| 2011/0136488 A1 | 6/2011 | Kuvvali et al. | |
| 2012/0140697 A1* | 6/2012 | Chen | H04W 28/06 370/315 |
| 2012/0224578 A1* | 9/2012 | Mih ly | H04L 12/4633 370/392 |
| 2013/0013791 A1 | 1/2013 | Kotecha et al. | |
| 2013/0028237 A1 | 1/2013 | Cheng et al. | |
| 2013/0058212 A1 | 3/2013 | Noy et al. | |
| 2013/0114408 A1 | 5/2013 | Sastry et al. | |
| 2013/0163428 A1 | 6/2013 | Lee et al. | |
| 2014/0064249 A1 | 3/2014 | Lee et al. | |
| 2014/0181267 A1 | 6/2014 | Wadkins et al. | |
| 2014/0207845 A1 | 7/2014 | Han et al. | |
| 2014/0258465 A1 | 9/2014 | Li | |
| 2014/0286239 A1 | 9/2014 | Chowdhury et al. | |
| 2014/0344414 A1* | 11/2014 | Ozawa | H04L 65/4076 709/219 |
| 2015/0296418 A1 | 10/2015 | Szilagyi et al. | |
| 2015/0365483 A1 | 12/2015 | Xiong et al. | |
| 2016/0050580 A1* | 2/2016 | Bosch | H04L 69/22 370/252 |

FOREIGN PATENT DOCUMENTS

| | | |
|---|---|---|
| KR | 1020140031630 A | 3/2014 |
| WO | 2012/078082 A1 | 6/2012 |
| WO | 2014/131153 A1 | 9/2014 |

OTHER PUBLICATIONS

Written Opinion of the International Searching Authority dated Mar. 4, 2016 in connection with International Patent Application No. PCT/KR2015/012981.

Supplementary European Search Report dated Sep. 22, 2017 in connection with European Patent Application No. 15 86 4710.

* cited by examiner

METHOD AND APPARATUS FOR CONFIGURING DISCONNECTED TCP CONNECTION IN COMMUNICATION SYSTEM, HANDOVER SUPPORT METHOD AND APPARATUS THEREFOR

CROSS-REFERENCE TO RELATED APPLICATIONS

This application is a National Phase Entry of PCT International Application No. PCT/KR2015/012981, which was filed on Dec. 1, 2015, and claims priority to Korean Patent Application No. 10-2014-0170058, which was filed on Dec. 1, 2014, the contents of which are incorporated herein by reference.

TECHNICAL FIELD

The present disclosure relates to a method and apparatus for configuring a transmission control protocol (TCP) connection in a communication system, and more particularly, to a method and apparatus for configuring a TCP connection in a communication system including a radio access network (RAN).

BACKGROUND

To satisfy demands for wireless data traffic having increased since commercialization of $4^{th}$-Generation (4G) communication systems, efforts have been made to develop improved $5^{th}$-Generation (5G) communication systems or pre-5G communication systems. For this reason, the 5G communication system or the pre-5G communication system is also called a beyond-4G-network communication system or a post-Long Term Evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud Radio Access Network (RAN), an ultra-dense network, a Device to Device (D2D) communication, a wireless backhaul, a moving network, cooperative communication, Coordinated Multi-Points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FMC), non-orthogonal multiple access (NOMA), and sparse code multiple access (SCMA) have been developed.

In a communication system, most Internet services use, as a transmission protocol, a transmission control protocol (TCP) designed for use of wired networks. However, in wireless networks such as a Long Term Evolution (LTE) system, a change in the quality of a transport network (e.g., a change in a radio channel) more frequently occurs than in wired networks.

FIG. 1 is a view for describing a general TCP connection between a user equipment (UE) of a wireless network and a service server of a wired network in a communication system, in which a communication system illustrated FIG. 1 is an LTE system as an example.

Referring to FIG. 1, to receive a service such as contents, etc., from a service server 170 of a service provider connected to the Internet, etc., a UE 110 configures a TCP connection with the service server 170 in an end-to-end fashion. In a procedure for configuring the TCP connection, the LTE system including a base station or an evolved Node B (eNB) 130 and a system architecture evolution (SAE) gateway (GW) 150 serves as a pipe for forwarding TCP-based data. The SAE GW 150 includes a serving GW (SGW) and a packet data network (PDN) GW in the LTE system. The TCP, which is an end-to-end protocol, depends on reception of a TCP ACK for transmission control, failing to promptly reflect a change in a radio channel of the wireless network, a radio access network (RAN). As a result, a TCP transmission delay (e.g., a video initial play time delay in case of video contents) increases, causing inconvenience to users provided with services.

SUMMARY

The present disclosure provides a method and apparatus for configuring a split TCP connection in a communication system.

The present disclosure also provides a method and apparatus for configuring a TCP session for performing RAN-based TCP transmission control to reduce a transmission delay in a communication system.

The present disclosure also provides a method and apparatus for supporting a handover in a communication system using the split TCP connection.

Moreover, the present disclosure provides a method and system for forwarding uplink (UL)/downlink (DL) data for RAN-based transmission control in a communication system using the split TCP connection.

According to an embodiment of the present disclosure, a method for configuring a transmission control protocol (TCP) connection by a TCP proxy in a communication system includes configuring a tunnel for transmitting and receiving data to and from an evolved Node B (eNB) and configuring a first TCP connection between a user equipment (UE) and the TCP proxy and a second TCP connection between the TCP proxy and a service server of an Internet protocol (IP) network in response to a TCP connection request of the UE.

According to an embodiment of the present disclosure, a TCP proxy device for configuring a TCP connection in a communication system includes a communication interface configured for communication with an eNB and a controller configured to configure a tunnel for transmitting and receiving data to and from the eNB and to configure a first TCP connection between a UE and the TCP proxy device and a second TCP connection between the TCP proxy device and a service server of an IP network in response to a TCP connection request of the UE.

According to an embodiment of the present disclosure, a method for forwarding downlink (DL) data in a TCP-based communication system includes receiving, by a second TCP proxy, information indicating switching of a data path due to a handover, from a first eNB through a first TCP proxy, in a network environment where the first eNB operating as a source eNB in the handover is connected with the first TCP proxy and a second eNB operating as a target eNB in the handover is connected with the second TCP proxy, receiving, by the second TCP proxy, first DL data buffered for the first eNB from the first TCP proxy having received the information and buffering the received first DL data, and receiving, by the second TCP proxy, second DL data from the second eNB through a data path switched by the handover and buffering the second DL data.

According to an embodiment of the present disclosure, a TCP proxy device for forwarding DL data in a TCP-based communication system includes a communication interface configured for data communication, a memory configured to buffer transmission and reception data, and a controller configured to receive information indicating switching of a data path due to a handover, from a first eNB through a first TCP proxy device, in a network environment where the first eNB operating as a source eNB in the handover is connected with the first TCP proxy device and a second eNB operating as a target eNB in the handover is connected with a second TCP proxy device, to receive first DL data buffered for the first eNB from the first TCP proxy having received the information and buffer the received first DL data in the memory, and to receive second DL data from the second eNB through a data path switched by the handover and buffer the second DL data in the memory.

According to an embodiment of the present disclosure, a method for forwarding uplink (UL) data in a TCP-based communication system includes receiving, by a second TCP proxy, information indicating switching of a data path due to a handover, from a first eNB through a first TCP proxy, in a network environment where the first eNB operating as a source eNB in the handover is connected with the first TCP proxy and a second eNB operating as a target eNB in the handover is connected with the second TCP proxy, sending, by the second TCP proxy, an acknowledgement response signal with respect to first UL data forwarded from the first TCP proxy, to the first TCP proxy having received the information, and buffering, by the second TCP proxy, second UL data received from the second eNB, performing transmission control with respect to the second UL data, and forwarding the second UL data to an IP network through the second eNB, according to switching of a data path corresponding to the handover.

According to an embodiment of the present disclosure, a TCP proxy device in a TCP-based communication system includes a communication interface configured for data communication, a memory configured to buffer transmission and reception data, and a controller configured to receive information indicating switching of a data path due to a handover, from a first eNB through a first TCP proxy device, in a network environment where the first eNB operating as a source eNB in the handover is connected with the first TCP proxy and a second eNB operating as a target eNB in the handover is connected with a second TCP proxy device, to send an acknowledgement response signal with respect to first UL data forwarded from the first TCP proxy device, to the first TCP proxy having received the information, and to buffer second UL data received from the second eNB, perform transmission control with respect to the second UL data, and forward the second UL data to an IP network through the second eNB, according to switching of a data path corresponding to the handover.

DETAILED DESCRIPTION

A detailed description of well-known functions or elements associated with embodiments of the present disclosure will be omitted if it unnecessarily obscures the subject matter of the present disclosure.

In the following detailed description of embodiments of the present disclosure, the embodiments of the present disclosure will focus on an evolved packet system (EPS)/Long Term Evolution (LTE) system as a main system, but the present disclosure is also applicable to various communication systems having similar technical backgrounds according to determinations of those of ordinary skill in the art. Therefore, it should be noted that the following embodiments of the present disclosure are not limited to an evolved Node B (eNB), a system architecture evolution (SAE) gateway (GW), and so forth in an LTE system.

The embodiments of the present disclosure propose a transmission control protocol (TCP) proxy which is connected to an eNB side of an LTE system to configure a split TCP connection between a radio access network (RAN) of the LTE system and a wired network to which a service server is connected, and to perform TCP transmission control. The embodiments of the present disclosure also propose a method and system structure for performing RAN-based TCP transmission control for a split TCP connection in view of the TCP proxy.

Although a TCP, an X2 interface, and so forth will be used as examples in an embodiment of the present disclosure, the TCP, the X2 interface, etc., may be replaced with other possible protocols or interfaces. A connection between eNBs and a connection between an eNB and a TCP proxy will be described using the X2 interface, but other replaceable interfaces may be used for those connections.

The embodiments of the present disclosure propose a scheme for splitting a TCP connection between a UE of a wireless network and a service server of a wired network into a first TCP connection between the eNB and a TCP proxy and a second TCP connection between the TCP proxy and the service server. The embodiments of the present disclosure also propose a scheme for forwarding data of the UE to the TCP proxy in a data transmission path of a GW→an eNB→a UE or the UE→the eNB→the GW in the LTE system.

In the embodiments of the present disclosure, a description will be made of a method of configuring, by the TCP proxy introduced in an eNB side, the split TCP connection (i.e., a TCP session) with the first TCP connection between the eNB and the TCP proxy and the second TCP connection between the TCP proxy and the service server and a structure of a communication system for the method, and then a method and system structure for forwarding UL/DL data for RAN-based transmission control in a handover of the UE in the communication system using the split TCP connection.

Figure 1:
FIG. 1 is a view for describing a general TCP connection between a UE of a wireless network and a service server of a wired network in a communication system.
Figure 2:
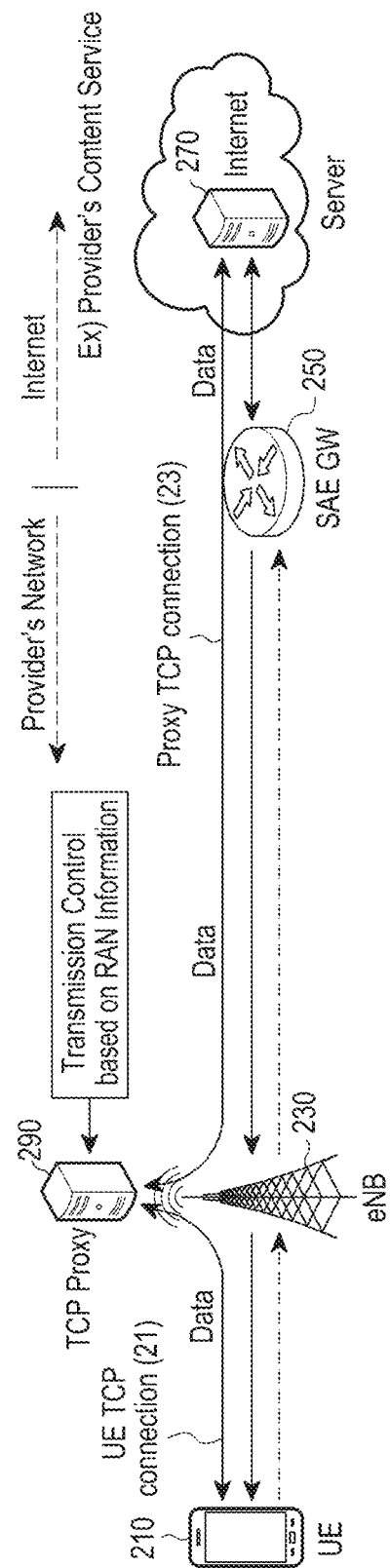
FIG. 2 is a view for describing a split TCP connection and a TCP proxy connected with an eNB for the split TCP connection in a communication system according to an embodiment of the present disclosure.

FIG. 2 is a view for describing a split TCP connection and a TCP proxy connected with an eNB for the split TCP connection in a communication system according to an embodiment of the present disclosure, in which a system of FIG. 2 may include an LTE system including a UE 210, an eNB 230, and a SAE GW 250 that includes an SGW and a packet data network (PDN) GW (PGW) (which are not shown), a service server 270 of an Internet protocol (IP)-based network such as the Internet, etc., which transmits and receives TCP-based data to and from the UE 210 through the SAE GW 250 of the LTE system, and a TCP proxy 290 connected to the eNB 230 to control configuring of a TCP connection (i.e., a TCP session) split into a first TCP connection 21 with the UE 210 in the RAN and a second TCP connection 23 with the service server 270 in a wired network. The TCP proxy 290 may be implemented with a network entity (e.g., a server) separated from the eNB 230 as an example illustrated in FIG. 2. In another embodiment, the TCP proxy 290 may be included in the eNB 230. That is, in regard to the split TCP connection, a TCP proxy may be installed in an eNB, and the TCP proxy installed in the eNB may split a TCP connection between the UE 210 and the service server 270 to speed up downloading.

Referring to FIG. 2, the TCP proxy 290 is connected with the eNB 230 through a communication interface. The communication interface may use a communication interface well known in an LTE system or a separate communication interface. A TCP connection between the UE 210 and the service server 270 is established by being split into the first connection 21 between the UE 210 and the TCP proxy 290 and the second connection 23 between the TCP proxy 290 and the service server 270. Herein, it would be understood that a UE TCP connection (or a UE TCP session) means the first connection 21 and a proxy TCP connection (or a proxy TCP session) means the second connection 23. The TCP proxy 290 receives data to be transmitted to the UE 210 from the service server 270 through the proxy TCP connection, and performs RAN-based transmission control for the UE TCP connection based on a channel environment change of the RAN. Information indicating the channel environment change of the RAN (hereinafter, RAN information) may be provided from the eNB 230 to the TCP proxy 290.

For example, in the embodiments of the present disclosure, for the RAN-based transmission control based on the radio channel change, the TCP proxy may obtain radio channel-related information from the eNB that serves the UE. Based on the obtained radio channel-related information, the TCP proxy may perform RAN-based transmission control, which reflects a channel state, for the UE TCP session. The TCP proxy may also transmit data to the eNB based on a desired transmission delay to cause the eNB to maintain a buffer size of the UE constant, thereby reducing the transmission delay. The channel state may be reflected into the buffer size.

Figure 3:
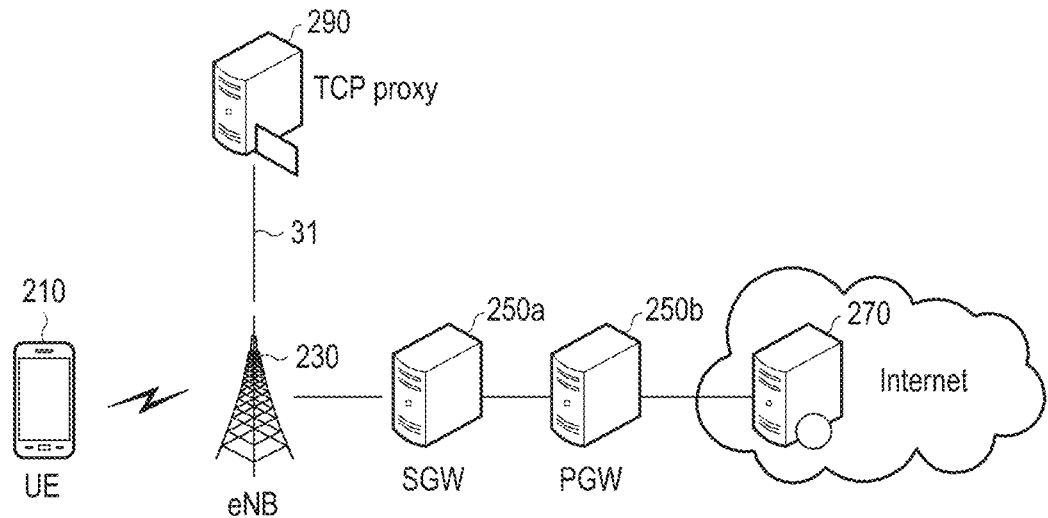
FIG. 3 is a view for describing a communication interface for a TCP proxy in a communication system according to an embodiment of the present disclosure.

FIG. 3 is a view for describing a communication interface for a TCP proxy in a communication system according to an embodiment of the present disclosure.

Referring to FIG. 3, reference numeral 31 indicates a communication interface (hereinafter, an Xt interface) for data transmission and reception between the eNB 230 and the TCP proxy 290, and an X2 interface for communication between eNBs in the LTE system may be used or a new communication interface may be configured and used. The Xt interface 31 performs at least one of a function of forwarding the RAN information to the TCP proxy 290, a function of establishing a proxy tunnel between the eNB 230 and the TCP proxy 290, a function of forwarding DL data destined to the UE 210 from the service server 270 to the TCP proxy 290, and a function of forwarding UL data received from the UE 210 to the TCP proxy 290. Although not shown in FIG. 3, a plurality of eNBs may be connected with the single TCP proxy 290, or the single eNB 230 may be connected with the single TCP proxy 290. The TCP proxy 290 may be connected with another TCP proxy for communication, and in this case, an interface for communication between TCP proxies may be defined. The interface for communication between the TCP proxies will be referred to as an Xp interface which will be described below in embodiments regarding a handover. In FIG. 3, an SGW 250a and a PGW 250b indicate a serving GW and a PDN GW included in the SAE GW 250 of FIG. 2.

<Split TCP Connection Configuration>

In the embodiments of the present disclosure, a TCP connection configuration procedure of the TCP proxy 290 will be described using roughly four processes 1) through 4):

1) TCP proxy preparation;
2) TCP proxy establishment;
3) TCP proxy teardown; and
4) TCP proxy modification.

TCP Proxy Preparation

In the TCP proxy preparation process, a path (i.e., a tunnel) for forwarding UL data destined from the UE 210 to the service server 270 or DL data destined to the UE 210 from the service server 270 to the TCP proxy 290 is established, and the tunnel is generated based on bearer information between the eNB 230 and the TCP proxy 290.

In a typical LTE system, UL data generated by a UE is forwarded to the Internet through an eNB, an SGW, and then a PGW, and DL data destined to the UE is forwarded to the UE through the PGW, the SGW, and then the eNB. The TCP proxy 290 proposed in an embodiment of the present disclosure may split a TCP connection and perform RAN-based transmission control after the eNB 230 forwards UL data or DL data to the TCP proxy 290. That is, since only a PGW identifies an IP and the eNB may not identify the IP in the LTE system, the eNB 230 incapable of identifying the IP forwards UL data or DL data, which is IP-based data, to the TCP proxy 290 capable of identifying the IP in an embodiment of the present disclosure. To this end, a bearer-based proxy tunnel is proposed so as for the eNB 230 to forward data received from the UE 210 to the TCP proxy 290.

Figure 4:
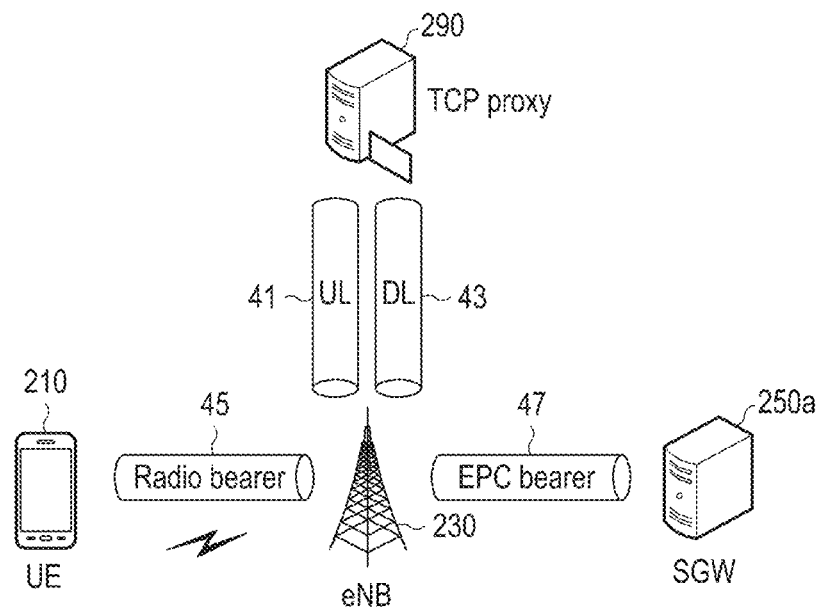
FIG. 4 is a view for describing a bearer-based proxy tunnel proposed in an embodiment of the present disclosure.

FIG. 4 is a view for describing a bearer-based proxy tunnel proposed in an embodiment of the present disclosure.

Referring to FIG. 4, the proxy tunnel includes a UL tunnel 41 for forwarding UL data received by the eNB 230 from the UE 210 through a radio bearer 45 to the TCP proxy 290 and then forwarding the UL data, which is transmission-controlled by the TCP proxy 290, back to the eNB 230, and a DL tunnel 43 for forwarding DL data received by the eNB 230 from the service server 270 through an EPC bearer 47 via the SGW 250a to the TCP proxy 290 and then forwarding the DL data, which is transmission-controlled by the TCP proxy 290, back to the eNB 230.

Meanwhile, in an embodiment of the present disclosure, to forward IP-based data or IP data forwarded from the service server 270 to the TCP proxy 290, the eNB 230 needs to identify the IP data among various types of data transmitted to and received from the UE 210. However, the eNB 230 is incapable of identifying the IP, such that an existing IP data identification scheme is not applicable to a TCP proxy structure of the present disclosure. To this end, an embodiment of the present disclosure proposes a scheme in which to forward only IP data to the TCP proxy 290, the eNB 230 identifies a type of data based on an access point name (APN) and forwards the IP data to the TCP proxy 290 in the unit of a bearer. For example, a Voice over LTE (VoLTE) call connection may use an IP multimedia subsystem (IMS) APN and an Internet connection may use an Internet APN. The eNB 230 identifies a bearer connected using the Internet APN as a target for transmission control and forwards data using the Internet APN to the TCP proxy 290. Although the APN is used as an example in an embodiment of the present disclosure, the eNB 230 may also use other bearer-related parameters such as a quality of service (QoS) class identifier (QCI), an allocation and retention priority (ARP), etc., which are stored/maintained/managed in the eNB, as well as the APN.

In another embodiment, a split TCP connection (session) technique proposed in an embodiment of the present disclosure may be selectively applied only to data transmitted to and received from a particular domain or a particular service server among IP data. For this end, schemes a) and b) are proposed as below.

a) The TCP Proxy 290 Determines Whether to Split a TCP Connection (Session)

When the eNB 230 forwards IP data to the TCP proxy 290 based on the APN, the TCP proxy 290 determines whether to apply the TCP proxy 290 according to a TCP proxy policy stored/maintained in the TCP proxy 290. The policy is a position of a service server or information configured by an operator or a provider, and may include domain information for performing or not performing TCP connection (session) splitting, and so forth. The domain information may include a domain list, a server address list, and so forth.

The TCP proxy 290 having received a forwarded TCP connection request (e.g., a TCP SYN message) of the UE 210 identifies the TCP proxy policy, performs TCP connection (session) splitting for a connection to which TCP proxy application is allowed, and forwards the IP data to an operator server without performing TCP connection (session) splitting for a connection to which TCP proxy application is not allowed. In this case, the TCP proxy 290 simply operates as a data transmission path and does not perform an additional operation.

b) The eNB 230 Determines Whether to Split a TCP Connection (Session)

Once the eNB 230 receives IP data from the UE 210, the eNB 230 determines TCP proxy application according to the TCP proxy policy stored/maintained in the eNB 230. The eNB 230 forwards the IP data to the TCP proxy 290 for a connection to which TCP proxy application is allowed, and forwards the P data to the SWG for a connection to which TCP proxy application is not allowed. To this end, the eNB 230 identifies an IP for every data packet.

The above-described various embodiments are possible, but for convenience, the following embodiments may correspond to a case where the eNB 230 forwards the IP data to the TCP proxy 290 and the TCP proxy 290 splits a TCP connection (session). In the embodiment of FIG. 4, the eNB 230 maps the radio bearer 45 with the UL tunnel 41 and maps the EPC bearer 47 with the DL tunnel 43. The eNB 230 transmits and receives IP-based UL data/DL data to and from the TCP proxy 290 through the proxy tunnels 41 and 43, respectively. Although the proxy tunnel includes the UL tunnel and the DL tunnel in the current embodiment, the proxy tunnel may include one tunnel through which the IP-based UL data and/or DL data may be transmitted and received in another embodiment.

<Table 1> shows an example of a mapping table (hereinafter, a proxy mapping table) for configuring and managing the above-described proxy tunnel, and the mapping table of <Table 1> is stored in the eNB 230.

TABLE 1

| UE | Bearer | | UL_proxy | DL_proxy | TCP Proxy |
|---|---|---|---|---|---|
| UE id | Radio Bearer id | EPC bearer id | UL id | DL id | TCP Proxy id |

In Table 1, UE id indicates an identity of a UE, and may use, for example, a globally unique temporary identifier (GUTI) in an LTE system. Assuming that the UE 210 uses only a default bearer of an Internet APN for IP data transmission and reception, a radio bearer id in Table 1 is an identity of a radio bearer allocated to a default EPC bearer of the Internet APN between the UE 210 and the eNB 230. In Table 1, the EPC bearer id is an identity of the default EPC bearer of the Internet APN. In Table 1, an UL identity (UL id) is an identity identified by the TCP proxy 290 to indicate the UL tunnel 41 between the eNB 230 and the TCP proxy 290, and is unique in the TCP proxy 290. That is, the eNB 230 transmits IP-based UL data received from the UE 210 to the TCP proxy 290 through the UL tunnel 41 identified by the UL id.

In Table 1, a DL identity (DL id) is an identity identified by the TCP proxy 290 to indicate the DL tunnel 43 between the eNB 230 and the TCP proxy 290, and is unique in the TCP proxy 290. That is, the eNB 230 transmits IP-based UL data received from the service server 270 through the SGW 250a to the TCP proxy 290 through the DL tunnel 43 identified by the DL id. The TCP proxy identity (TCP proxy id) is an identity of the TCP proxy 290 connected with the eNB 230.

Table 2 shows an example of a mapping table (hereinafter, an eNB mapping table) stored in the TCP proxy 290 for configuring and managing the proxy tunnel.

TABLE 2

| UE | UL_eNB | DL_eNB | eNB | TCP session(s) |
|---|---|---|---|---|
| UE id | UL id | DL id | eNB id | TCP session info. |

In Table 2, UE id indicates an identity of a UE, and may use, for example, a GUTI in an LTE system. UL id is an identity identified by the eNB 230 to indicate the UL tunnel 41 between the eNB 230 and the TCP proxy 290, and is unique in the eNB 230. That is, the TCP proxy 290 performs transmission control with respect to IP-based UL data, which is received from the eNB 230 and is transmitted from the UE 210 to the service server 270, and then transmits the transmission-controlled IP-based UL data to the eNB 230 through the UL tunnel 41 identified by UL id.

In Table 2, DL id is an identity identified by the eNB 230 to indicate the DL tunnel 43 between the eNB 230 and the TCP proxy 290, and is unique in the eNB 230. That is, the TCP proxy 290 performs transmission control with respect to IP-based DL data, which is received from the eNB 230 and is transmitted from the service server 270 to the UE 210, and then transmits the transmission-controlled IP-based UL data to the eNB 230 through the DL tunnel 43 identified by DL id.

In Table 2, eNB id is an identity of the eNB 230 connected with the TCP proxy 290 to transmit and receive IP data of the UE 210. TCP session information (session info.) is information about a split TCP connection managed by the TCP proxy 290 for the UE 210. The TCP session information may include 5 tuple (source IP, destination IP, source port, destination port, protocol) information regarding a TCP session, TCP state information (e.g., the amount of IP data transmitted by the TCP proxy 290, etc., a sequence number), and so forth.

TCP Proxy Establishment

The TCP proxy establishment process is a process of splitting, by the TCP proxy 290, a TCP connection into the UE TCP connection and the proxy TCP connection in response to a TCP connection creation request of the UE 210. Once the UE 210 sends a TCP connection creation request to the eNB 230, the eNB 230 forwards the request to the TCP proxy 290. The TCP proxy 290 detects a message for requesting TCP connection configuration (hereinafter, a TCP SYN message) from data received from the eNB 230 and splits the TCP connection from the UE 210 to the service server 270. The TCP connection is also called a TCP session. Herein below, the TCP connection will be referred to as the TCP session.

Figure 5A:
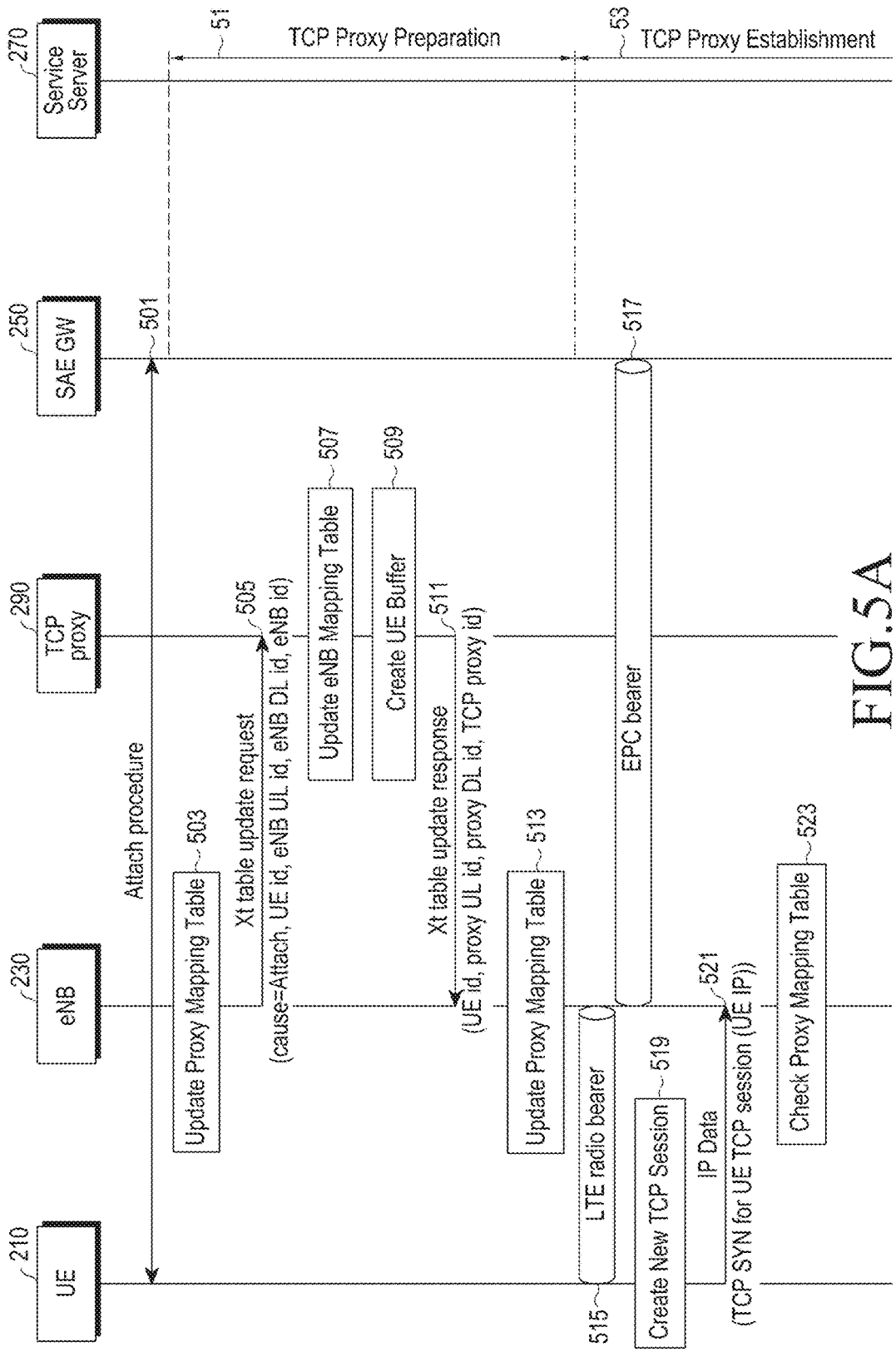
FIGS. 5A through 5C are ladder diagrams of procedures for TCP proxy preparation and TCP proxy establishment according to an embodiment of the present disclosure.
Figure 5B:
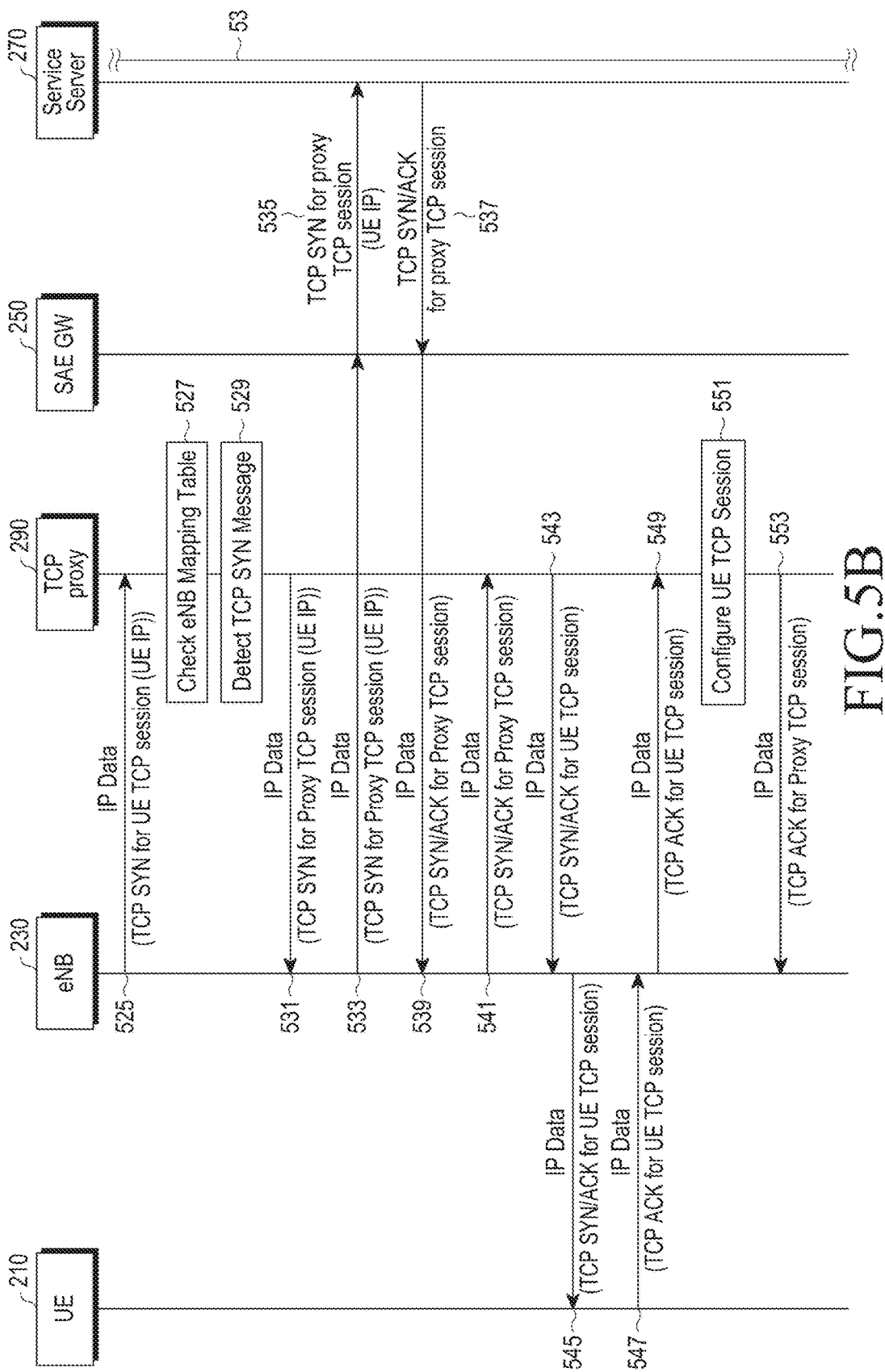
Figure 5C:
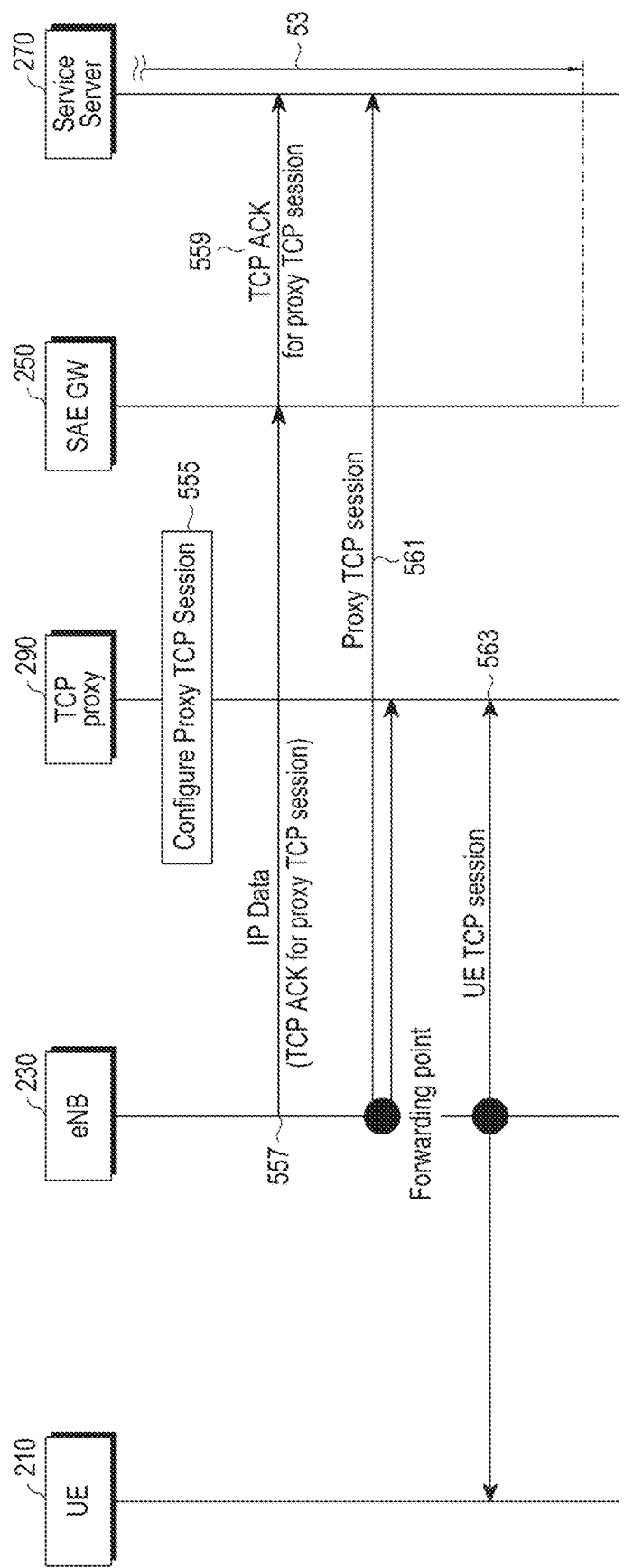

FIGS. 5A through 5C are ladder diagrams of procedures for TCP proxy preparation and TCP proxy establishment according to an embodiment of the present disclosure, in which when the UE 210 attached to the LTE system executes, for example, an Internet application (a video streaming application, etc.) to send a TCP session creation request to the service server 270, the TCP proxy 290 configures a split TOP session by splitting the TCP session into the UE TCP session and the proxy TCP session.

In operation 501, after completion of or during an Attach procedure of the UE 210, the eNB 230 performs the TCP preparation process with the TCP proxy 290 through the Xt interface.

In FIGS. 5A through 5C, operations 503 through 513 correspond to the TCP preparation process, and operations 519 through 563 correspond to the TCP proxy establishment process. Operations 515 and 517 correspond to a radio bearer and an EPC bearer generated according to the Attach procedure of operation 501, respectively.

First, as to the TCP preparation process, in operation 503, once the UE 210 sends an attach request, the eNB 230 determines whether information related to the UE 210 exists in a proxy mapping table managed by the eNB 230, and generates an entry for the UE 210 to update the proxy mapping table if the related information does not exist. In operation 505, the eNB 230 transmits an Xt table update request (including (cause=Attach, UE id, eNB UL id, eNB DL id, and eNB id) to the TCP proxy 290. The Xt table update request is a message the eNB 230 transmits to the TCP proxy 290 to update (create, change, delete, etc.) proxy tunnel-related information described with reference to FIG. 4. The 'cause' included in the Xt table update request message indicates an event due to which the update request is generated. The 'cause' may be, for example, Attach, Handover, etc. The 'cause' may be indicated by a value set for each event, and the TCP proxy 290 may receive the value of the 'cause' from the eNB 230 to determine creation, change, or deletion of the eNB mapping table. In the Xt table update request message, UE id, eNB UL id, eNB DL id, and eNB id are as described with reference to Table 1 and Table 2.

In operation 507, the TCP proxy 290 updates the eNB mapping table by adding an entry of the UE 210 to the eNB mapping table based on information received through the Xt table update request. In operation 509, the TCP proxy 290 creates a buffer for the UE 210. The buffer buffers IP data to which RAN-based transmission control is applied. In operation 511, the TCP proxy 290 sends an Xt table update response (including UE id, proxy UL id, proxy DL id, and TCP proxy id) to the eNB 230 in response to the Xt table update request. UE id, proxy UL id, proxy DL id, and TCP proxy id are as described with reference to Table 1 and Table 2. In operation 513, the eNB 230 completes updating of the proxy mapping table in which the entry of the UE 210 is added, based on information received through the Xt table update response.

Next, as to the TCP proxy establishment process, the radio bearer and the EPC bearer are created as in operations 515 and 517 in the Attach procedure of operation 501, and the P data generated by execution of the application of the UE 210 is transmitted and received through these bearers. In the following process, data is application-level data forwarded through the bearers. The application-level data may be, for example, TCP data transmitted and received through a default bearer of the Internet APN. Although operations 515 and 517 are illustrated after the TCP preparation process, they are illustrated for convenience, and the bearers are created after the Attach procedure, such that times to perform operations 515 and 517 may be different from the illustration of FIG. 5A.

When the UE 210 generates a TCP session creation request destined to the service server 270 due to execution of an application in operation 519 of FIG. 5A, the UE 210 sends a TCP SYN message for the UE TCP session, which requests TCP connection configuration, to the eNB 230 to configure the TCP session with the service server 270 in operation 521. The eNB 230 having received the TCP SYN message for the UE TCP session checks the proxy mapping table for configuring and managing the proxy tunnel of FIG. 4 in operation 523, and forwards the IP data received from the UE 210 to the TCP proxy 290 through the UL tunnel 41 in operation 525 of FIG. 5B. The TCP proxy 290 checks the eNB mapping table for configuring and managing the proxy tunnel in operation 527, and detects the TCP SYN message sent from the UE 210 from the received IP data in operation 529.

In operation 531, the TCP proxy 290 stores information about the TCP session creation request to split the TCP session (that is, to create the proxy TCP session) and transmits the TCP SYN message for the proxy TCP session to the service server 270 and the eNB 230. In operations 533 and 535, the TCP SYN message for the proxy TCP session is forwarded from the eNB 230 to the service server 270 through the SAE GW 250. Forwarding of the TCP SYN message is performed through general IP routing. The TCP SYN message forwarded to the service server 270 in this way uses an IP of the UE 210 as a source IP. In operations 537 and 539, a TCP SYN/ACK message transmitted as an acknowledgement message with respect to the TCP SYN message for the proxy TCP session is forwarded to the eNB 230 through the SAE GW 250.

The eNB 230 forwards the received TCP SYN/ACK message to the TCP proxy 290 through the DL tunnel 43 in operation 541, and the TCP proxy 290 stores information of the received TCP SYN/ACK and forwards the received TCP SYN/ACK for the UE TCP session to the eNB 230 through the DL tunnel 43.

In operations 545 and 547, the eNB 230 forwards the received TCP SYN/ACK for the UE TCP session to the eNB 210, and receives a TCP ACK for the UE TCP session from the UE 210 and forwards the TCP ACK to the TCP proxy 290 through the UL tunnel 41. The TCP proxy 290 having received the TCP ACK then configures the UE TCP session in operation 551. The TCP proxy 290 forwards a TCP ACK for the proxy TCP session to the eNB 230 in operation 553, and establishes the proxy TCP session in operation 555 of FIG. 5C. In operations 557 and 559, the TCP ACK for the proxy TCP session is forwarded from the eNB 230 having received the TCP ACK to the service server 270 through the SAE GW 250.

As such, the split TCP session, i.e., the UE TCP session and the proxy TCP session are configured, and UL/DL data transmitted and received between the UE 210 and the service server 270 are transmission-controlled by the TCP proxy 290 through the configured UE TCP session and proxy TCP session in operations 561 and 563, In this case, the TCP proxy 290 may perform RAN-based transmission control based on a channel environment change of the RAN.

TCP Proxy Teardown

The TCP proxy teardown process is a process in which the TCP proxy 290 tears down (or release) the split TCP session in a particular situation. The TCP proxy 290 generates TCP Finish (FIN) data and transmits the TCP FIN data to the UE 210 and the service server 270 to tear down (or release) the split TCP session. This process may be performed, for example, when the UE 210 hands over to a legacy eNB having no connection with the TCP proxy 290 or a load is generated in the TCP proxy 290.

TCP Proxy Modification

If an event requiring a change of information in a mapping table occurs, the proxy mapping table and the eNB mapping table maintained by the eNB 230 and the TCP proxy 290 are updated. For example, if the UE 210 hands over, an eNB that transmits IP data of the UE 210 is changed and such information needs to be reflected into the mapping table. This process is called the TCP proxy modification process. In an embodiment of the present disclosure, the TCP proxy modification process will be described using the handover event as an example. However, the TCP proxy modification process may also be performed in other situations than the handover.

<Handover>

When being implemented in an actual network, the TCP proxy 290 may coexist with a legacy eNB, and a plurality of eNBs may be connected to the same TCP proxy 290 or one eNB may be connected to the TCP proxy 290. According to an embodiment of the present disclosure, when the eNB 210 moves in a TCP proxy structure, there may be various handover scenarios.

Figure 6:
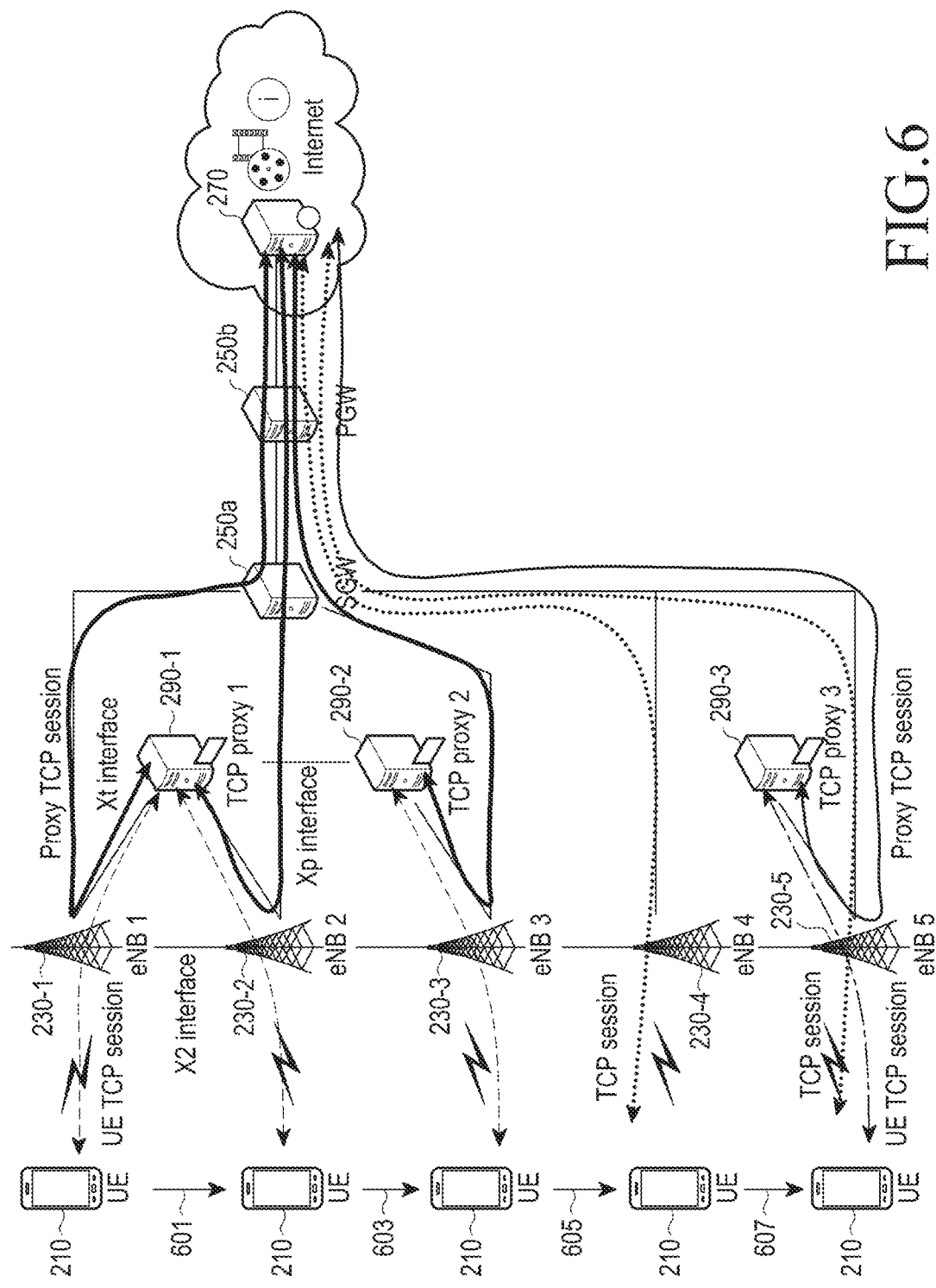
FIG. 6 is a view for describing various examples of a TCP proxy handover scenario in a communication system according to an embodiment of the present disclosure.

FIG. 6 is a view for describing various examples of a TCP proxy handover scenario in a communication system according to an embodiment of the present disclosure, in which for convenience, various examples of handover scenarios are illustrated in a single drawing. The handover scenarios are indicated by 601, 603, 605, and 607, respectively.

In FIG. 6, reference numeral 601 indicates a TCP proxy handover scenario (hereinafter, Scenario 1) when a source eNB 1 230-1 and a target eNB 2 230-2 are connected to an identical TCP proxy 1 290-1, 604 indicates a TCP proxy handover scenario (hereinafter, Scenario 2) when the source eNB 2 230-2 and a target eNB 3 230-3 are connected to different TCP proxies 1 and 2 290-1 and 290-2, 605 indicates a TCP proxy handover scenario (hereinafter, Scenario 3) when the source eNB 3 230-3 is connected with the TCP proxy 2 290-2, but a target eNB 4 230-4 is a legacy eNB connected with no TCP proxy, and 607 indicates a TCP proxy handover scenario (hereinafter, Scenario 4) when the source eNB 4 230-4 is a legacy eNB connected with no TCP proxy, but a target eNB 5 230-5 is connected with a TCP proxy 3 290-3. The above examples of the TCP proxy handover scenarios of FIG. 6 will be described in more detail.

Scenario 1) when a Source eNB and a Target eNB are Connected to an Identical TCP Proxy Referring to FIG. 6, in Scenario 1, it is assumed that through the eNB 1 230-1, the UE TCP session between the TCP proxy 1 290-1 and the UE 210 has been configured and the proxy TCP session between the TCP proxy 1 290-1 and the service server 270 has been configured. When the UE 210 moves to a coverage of the eNB 2 230-2, the TCP proxy 1 290-1 receives forwarded data, transmitted through the split TCP session of the UE 210, from the eNB 2 230-2. To this end, in an embodiment of the present disclosure, during the handover procedure, updating of a proxy tunnel, that is, updating of an eNB mapping table and a proxy mapping table is performed.

During the handover procedure of the UE 210, the TCP proxy 1 290-1 receives DL data from the target eNB 2 230-2 as well as from the source eNB 1 230-1. The TCP proxy 1 290-1 may have a TCP transmission ordering problem when simultaneously receiving forwarded DL data of the UE 210 in a single UE buffer included in the TCP proxy 1 290-1 from a plurality of eNBs 230-1 and 230-2. To solve the problem, the TCP proxy 1 290-1 maintains a UE buffer for a source eNB and a UE buffer for a target eNB during the handover procedure. That is, the TCP proxy 1 290-1 maintains a plurality of buffers for eNBs, respectively, for the UE 210, thereby solving the TCP transmission ordering problem. Although the UE 210 is receiving a service from the target eNB 230-2 based on a handover, there is a period in which the UE 210 may be still subject to RAN-state-based transmission control of the source eNB 1 230-1 due to handover-caused data forwarding from the source eNB 230-1 to the target eNB 230-2.

As to data forwarding in a handover procedure in an LTE system, the SGW 250a transmits DL data of the UE 210 to the source eNB 230-1. Upon receiving a data path switch request from the target eNB 230-2, the SGW 250a switches a data path and sends, to the source eNB 230-1, an end marker indicating that DL data is not be transmitted any longer. The SGW 250a transmits the DL data of the UE 210 to the target eNB 230-2 at a moment when the data path is switched to the target eNB 230-2.

In an embodiment of the present disclosure, after completing transmission of the DL data received from the SGW 250a to the target eNB 250-2, the source eNB 230-1 forwards the end marker to the target eNB 230-2. The target eNB 230-2 then recognizes from the end marker that there is no more DL data to be received from the source eNB 230-1. In this way, after completing forwarding of the DL data forwarded from the source eNB 230-1 to the UE 210, the target eNB 230-2 transmits the DL data directly received from the SGW 250a to the UE 210, such that ordering of TCP data transmission may be performed stably.

Figure 7:
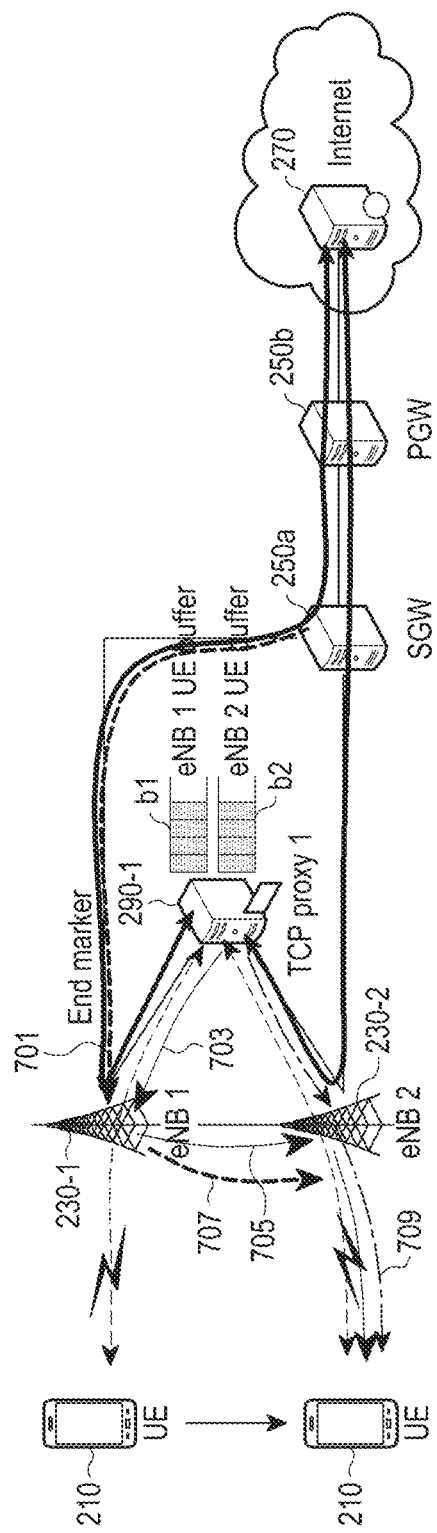
FIG. 7 is a view for describing a DL data reception method in a TCP proxy handover scenario 1 according to an embodiment of the present disclosure.

FIG. 7 is a view for describing a DL data reception method in the TCP proxy handover scenario 1 according to an embodiment of the present disclosure.

Referring to FIG. 7, the TCP proxy 1 290-1 receives IP data of the UE 210 through the eNB 1 230-1 and buffers the received IP data in an eNB 1 UE buffer b1 for the eNB 1 230-1. The SGW 250a performs path switching based on a request of the eNB 2 230-2 and then sends an end marker to the eNB 1 230-1. The SGW 250a then transmits the DL data to the eNB 2 230-2 which then forwards the received DL data to the TCP proxy 1 290-1 through a proxy tunnel update procedure. The TCP proxy 1 290-1 buffers the DL data of the UE 210, received through the eNB 2 230-2, in a newly created eNB 2 UE buffer b2 for the eNB 2 230-2.

More specifically, in operation 701, upon receiving the end marker from the SGW 250a, the eNB 1 230-1 does not receive DL data any more. However, since the eNB 1 230-1 forwards IP data of the UE 210 to the TCP proxy 1 290-1, the eNB 1 230-1 receives DL data of the UE 210, which is transmission-controlled by the TCP proxy 1 290-1, even after receiving the end marker. In operations 703 and 705, the eNB 1 230-1 forwards the DL data, received from the TCP proxy 1 290-1, to the eNB 2 230-2. The DL data forwarded in this way is subject to eNB 1/RAN-based transmission control of the TCP proxy 1 290-1.

In operation 707, the eNB 1 230-1 forwards the end marker to the eNB 2 230-2 if data transmission from the TCP proxy 1 290-1 is completed. In operation 709, after completing transmission of the DL data, forwarded from the eNB 1 230-1, to the UE 210, the eNB 2 230-2 then transmits the DL data, forwarded from the TCP proxy 1 290-1, to the UE 210. The DL data forwarded from the TCP proxy 1 290-1 to the eNB 2 230-2 is data that is to be subject to eNB 2/RAN-based transmission control.

In the handover procedure of the LTE system, the UE completes a handover to the target eNB prior to the path switching process of the SGW. In other words, the UE 210 may be subject to eNB 1/RAN-based transmission control, even if completing a handover to the eNB 2 230-2 prior to operation 701. Considering an ever-increasing transmission speed of a network, the amount of data forwarded to the TCP proxy 1 290-1 during the handover procedure may be significantly large. Thus, there is a method for applying transmission control at the right time close to a moving time of the UE 210.

Figure 8:
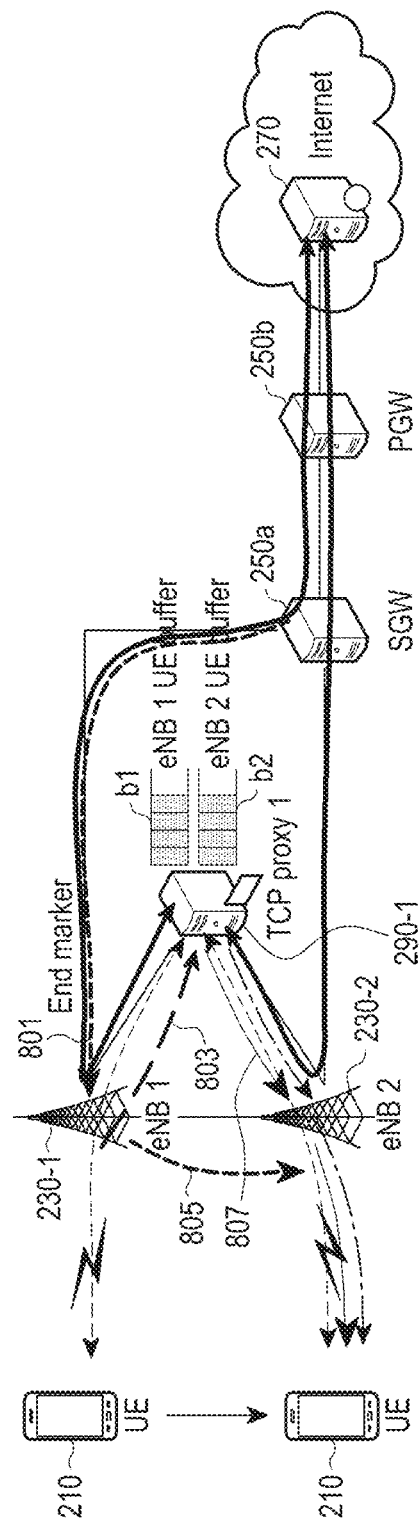
FIG. 8 is a view for describing a DL data reception method using fast DL data forwarding in a TCP proxy handover scenario 1 according to an embodiment of the present disclosure.

FIG. 8 is a view for describing a DL data reception method using fast DL data forwarding in the TCP proxy handover scenario 1 according to an embodiment of the present disclosure.

Referring to FIG. 8, in operation 801, the SGW 250a performs path switching and then sends an end marker to the eNB 1 230-1. In operation 803, the eNB 1 230-1 having received the end marker informs the TCP proxy 1 290-1 of reception of the end marker. In operation 805, the eNB 1 230-1 forwards the end marker to the eNB 2 230-2. In operation 807, the TCP proxy 1 290-1 having received the end marker forwards data buffered in the eNB 1 UE buffer b1 through the eNB 2 230-2 instead of the eNB 1 230-1. The TCP proxy 1 290-1 applies eNB 2/RAN-based transmission control in data transmission. The TCP proxy 1 290-1 transmits data buffered in the eNB 2 UE buffer b2 to the eNB 2 230-2 by applying eNB 2/RAN-based transmission control. By applying the embodiment of FIG. 8, even if the UE 210 is within a coverage of the eNB 2 230-2, data of the UE 210 under transmission control based on the eNB 1 230-1 may be subject to transmission control based on the eNB 2 230-2 at the right time and may be transmitted to the UE 210.

Figure 9A:
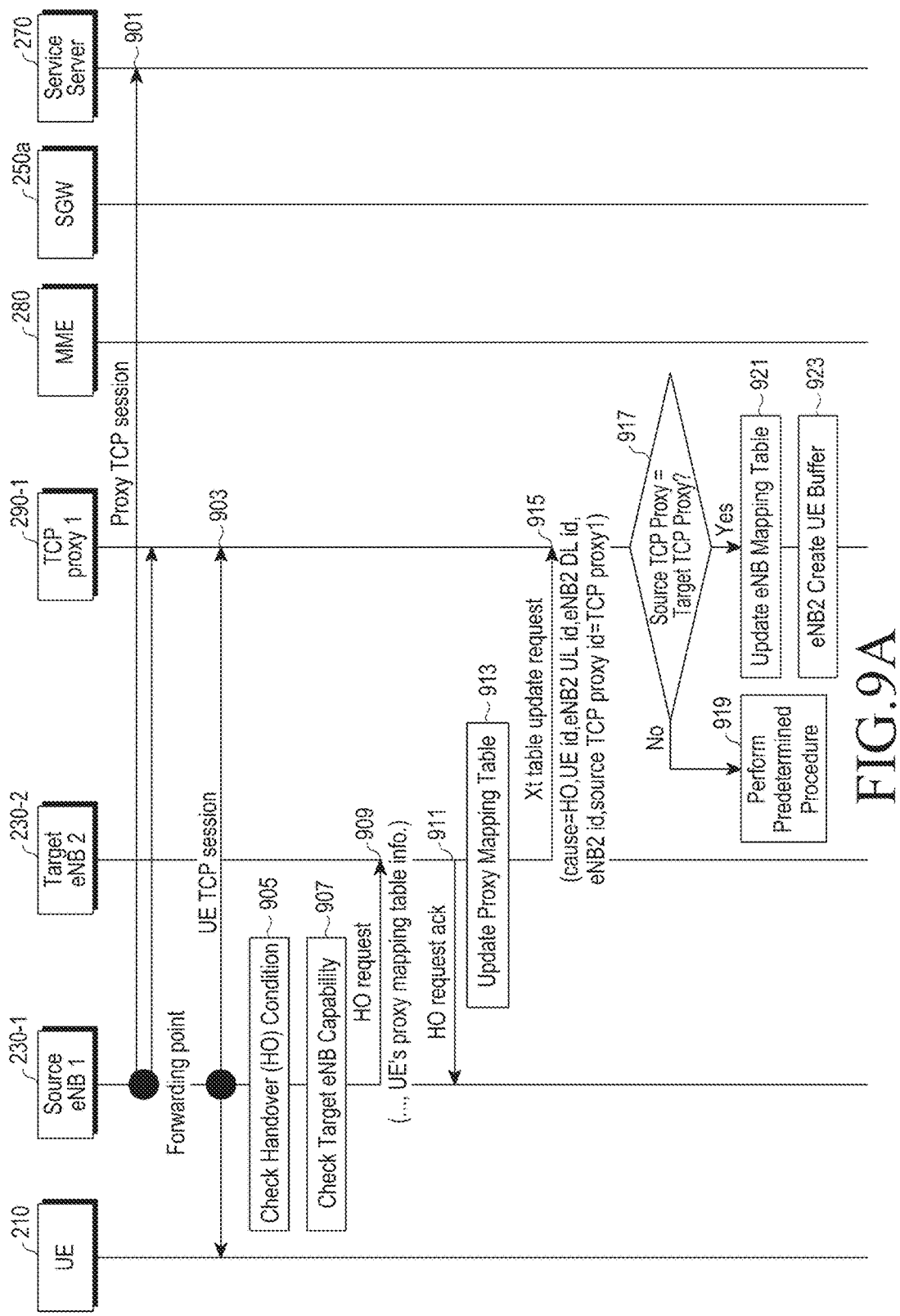
FIGS. 9A through 9C are ladder diagrams of a handover procedure when a TCP proxy handover scenario 1 is applied according to an embodiment of the present disclosure.
Figure 9B:
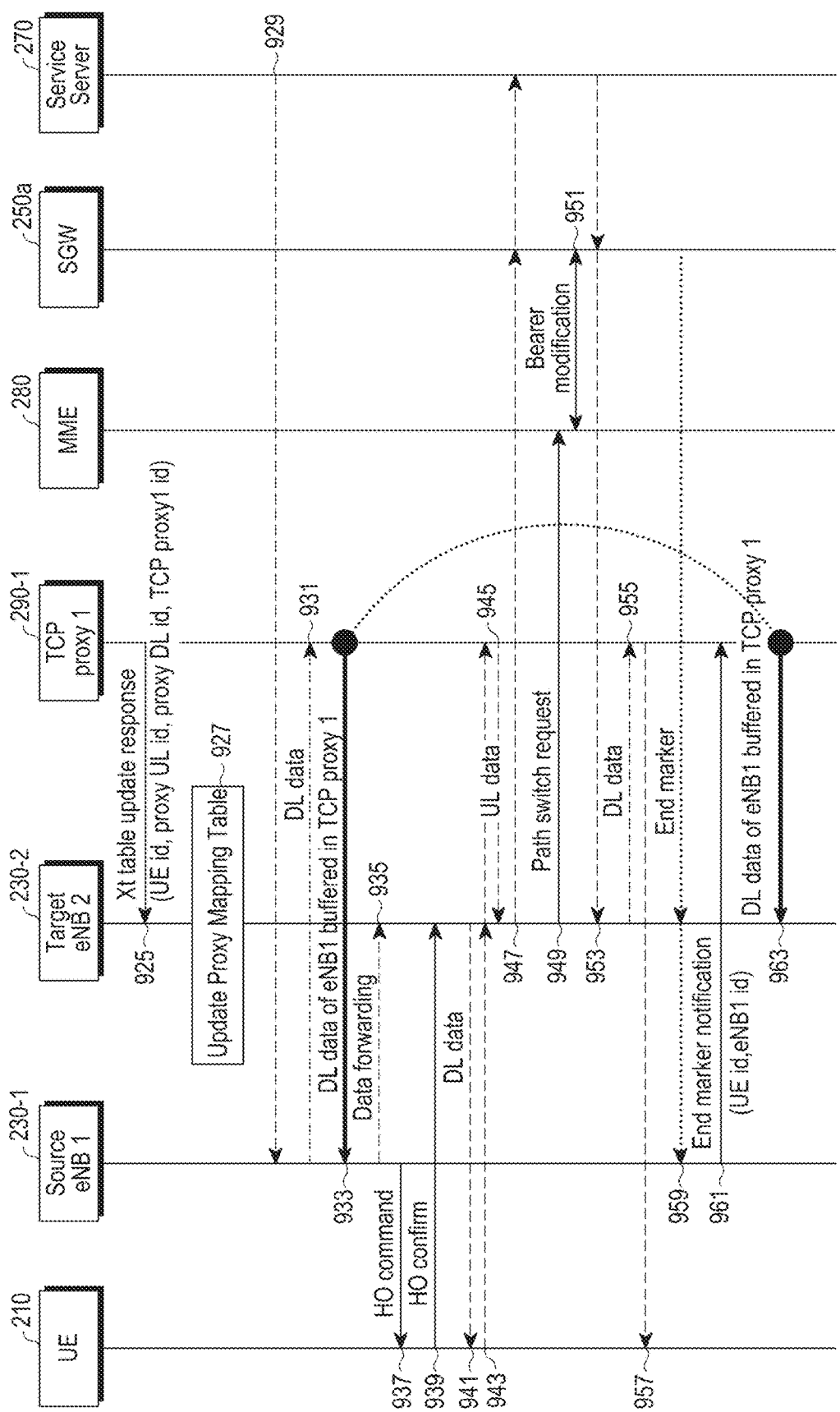
Figure 9C:
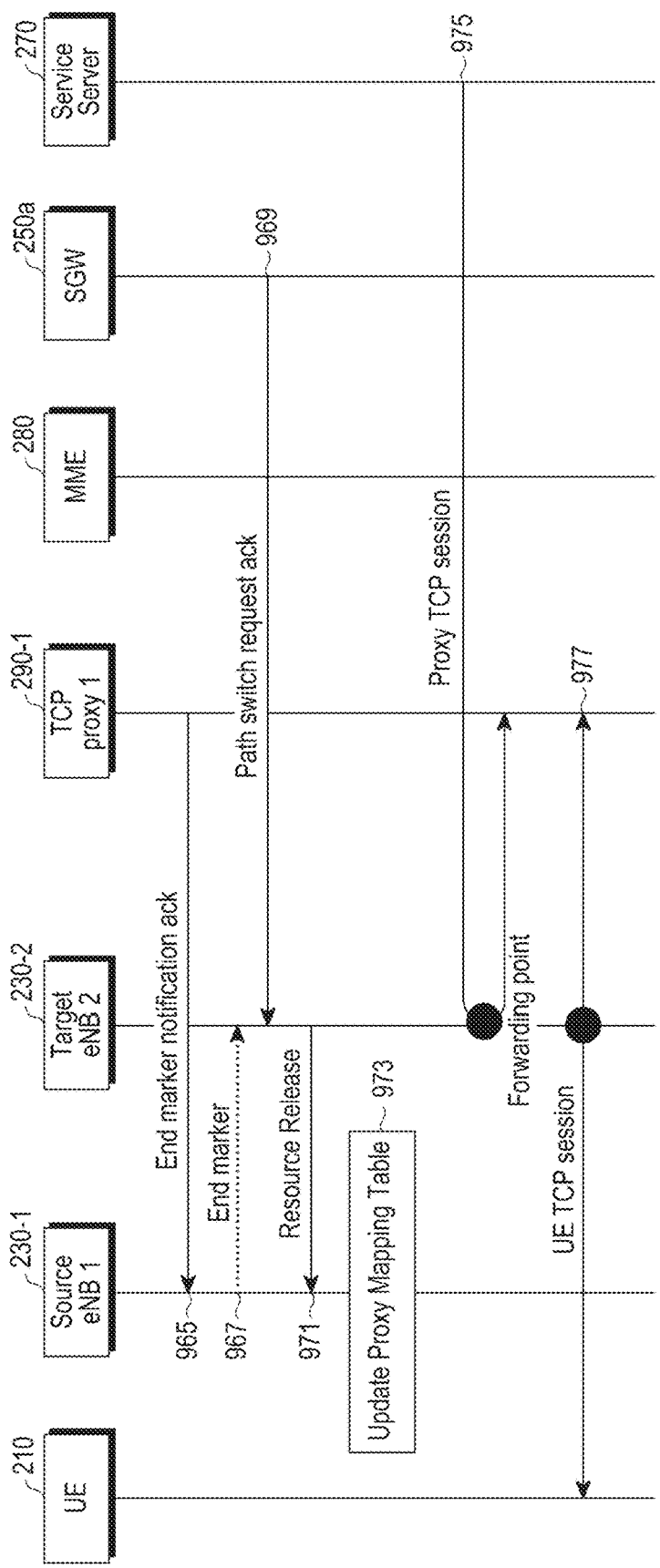

FIGS. 9A through 9C are ladder diagrams of a handover procedure when the TCP proxy handover scenario 1 is applied according to an embodiment of the present disclosure, in which the handover procedure is illustrated for a case when a source eNB and a target eNB are connected to an identical TCP proxy. In operations 901 and 903, it is assumed that through the eNB 1 230-1, the UE TCP session between the TCP proxy 1 290-1 and the UE 210 has been configured and the proxy TCP session between the TCP proxy 1 290-1 and the service server 270 has been configured. In the above handover procedure, operations 905 through 927 correspond to a proxy tunnel update process and a UE buffer (eNB 2 UE buffer) creation process for the eNB 2 230-2, and operations 929 through 973 correspond to a fast DL data forwarding process and a UE buffer (eNB 1 UE buffer) removal process for the eNB 1 230-1.

In regard to the proxy tunnel update process and the eNB 2 UE buffer creation process, in operation 905, the eNB 1 230-1 checks a handover condition/criterion based on a measurement report transmitted by the UE 210. The handover condition may include whether a target eNB supports a TCP proxy according to an embodiment of the present disclosure. In this case, operation 907 may be omitted. In the current embodiment, a source eNB is assumed to know based on a configuration whether a neighboring eNB including a target eNB supports the TCP proxy. In operation 907, the eNB 1 230-1 determines whether the target eNB 2 230-2 supports the TCP proxy. If the eNB 2 230-2 supports the TCP proxy, the eNB 1 230-1 sends a handover (HO) request message including proxy mapping table information (UE's proxy mapping table info.) to the eNB 2 230-2. The UE's proxy mapping table info. is the same as that included in the proxy mapping table stored in the eNB 1 230-1.

The eNB 2 230-2 sends an HO request ack to the eNB 1 230-1 in operation 911, and the eNB 2 230-2 updates the proxy mapping table based on information received through the HO request message in operation 913. In other words, the eNB 2 230-2 adds an entry for the UE 210 to the proxy mapping table. In operation 915, the eNB 2 230-2 sends, to the TCP proxy 1 290-1, an Xt table update request (including cause=HO, UE id, eNB2 UL id, eNB2 DL id, eNB2 id, and TCP proxy1 id) for updating (creating, changing, deleting, etc.) proxy tunnel-related information. Since the Xt table update request is generated due to a handover event, the 'cause' is set to a handover (cause=HO). The eNB 2 230-2 forwards eNB2 UL id and eNB2 DL id described in Table 1 to the TCP proxy 1 290-1, together with id of the eNB 2 230-2, to configure the proxy tunnel between the eNB 2 230-2 and the TCP proxy 1 290-1. TCP proxy 1 id is a Source TCP proxy id, which is an id of the TCP proxy 1 290-1 with which the eNB 1 230-1 has the proxy tunnel.

In operation 917, the TCP proxy 1 290-1 determines based on the information received through the Xt table update request that updating of an eNB mapping table is needed due to HO, and identifies a source TCP proxy. That is, the TCP proxy 1 290-1 determines whether the source TCP proxy and a target TCP proxy are the same as each other. If the source TCP proxy and the target TCP proxy are different from each other, a predetermined procedure is performed. The predetermined procedure may be a procedure to be described later with reference to FIGS. 12A through 12C. In the current embodiment, the source TCP proxy and the target TCP proxy are assumed to be the same as each other. In operation 921, the TCP proxy 1 290-1 determines that there is an eNB mapping table of the UE 210 and stores the information received through the Xt table update request to update the eNB mapping table. In operation 923, the TCP proxy 1 290-1 creates an eNB 2 UE buffer for the eNB 2 230-2. In operation 925, the TCP proxy 1 290-1 sends an Xt table update response (including UE id, proxy UL id, proxy DL id, and TCP proxy 1 id) to the eNB 2 230-2 in response to the Xt table update request. The TCP proxy 1 290-1 forwards proxy UL id and proxy DL id, together with its id, to the eNB 2 230-2 through the Xt table update response to configure the proxy tunnel with the eNB 2 230-2. In operation 927, the eNB 2 230-2 updates the proxy mapping table based on information received through the Xt table update response.

In regard to the fast DL data forwarding process and the eNB 1 UE buffer removal process for the eNB 1 230-1, in operations 929 and 931, DL data destined to the UE 210 is forwarded to the TCP proxy 1 290-1 still through the eNB 1 230-1. The TCP proxy 1 290-1 transmits data of the eNB 1 UE buffer to the eNB 1 230-1 through eNB 1/RAN-based transmission control in operation 933, and the eNB 1 230-1 forwards the received DL data of the UE 210 to the eNB 2 230-2 in operation 935. The eNB 1 230-1 sends an HO command to the UE 210 in operation 937, and the UE 210 sends an HO confirm message with respect to the HO command to the eNB 2 230-2 and completes the handover to the eNB 2 230-2 in operation 939. After completion of the handover, the UE 210 receives the DL data from the eNB 2 230-2 in operation 941.

In operation 943, the UE 210 transmits UL data to the eNB 2 230-2. Meanwhile, the eNB 2 230-2 having received the HO confirm message from the UE 210 sends a path switch request to a mobility management entity (MME) 280, which is a mobility-controlling network entity in operation 949, and the MME 280 performs a bearer modification process with the SGW 250a in operation 951. The bearer modification process includes a process in which the SGW 250a switches a data transmission path to the target eNB 2 230-2.

In operations 953, 955, and 957, the DL data destined to the UE 210 is forwarded to the TCP proxy 1 290-1 through the eNB 2 230-2 and is transmitted to the UE 210 from the TCP proxy 1 290-1 through the eNB 2 230-2. Once the SGW 250a sends an end marker to the eNB 1 230-1 in operation 959, the eNB 1 230-1 sends an end marker notification (including UE id and eNB1 id) to the TCP proxy 1 290-1 in operation 961. 'eNB1 id' included in the end marker notification is a source eNB id, such that if the TCP proxy 1 290-1 is capable of recognizing merely with UE id that the end marker is sent from the source eNB (i.e., the eNB 1 230-1), transmission of 'eNB1 id' may be omitted.

In operation 963, the TCP proxy 1 290-1 transmits DL data buffered in the eNB 1 UE buffer to the eNB 2 230-2 by applying eNB 2/RAN-based transmission control. The TCP proxy 1 290-1 removes the eNB 1 UE buffer after transmitting all the DL data of the eNB 1 UE buffer. In operation 965, the TCP proxy 1 290-1 sends an end marker notification ack to the eNB 1 230-1. The eNB 1 230-1 then sends an end marker to the eNB 2 230-2 in operation 967, and the SGW 250a sends a patch switch request ack with respect to the path switch request of operation 949 to the eNB 2 230-2 in operation 969. The eNB 2 230-2 then sends a resource release message to the eNB 1 230-1 in operation 971, and the eNB 1 230-1 updates the proxy mapping table by deleting an entry of the UE 210 from the proxy mapping table in operation 973. In operations 975 and 977, through the eNB 2 230-2, the UE TCP session between the TCP proxy 1 290-1 and the UE 210 is configured and the proxy TCP session between the TCP proxy 1 290-1 and the service server 270 is configured.

Scenario 2) when a Source eNB and a Target eNB are Connected to Different TCP Proxies In an embodiment of the present disclosure, when a source eNB and a target eNB are connected to different TCP proxies, updating of a proxy tunnel is needed like in Scenario 1. Let a TOP proxy connected to the source eNB be a source TCP proxy and a TCP proxy connected to the target eNB be a target TCP proxy, then in Scenario 2, to obtain split TCP session information managed by the source TCP proxy, the target TCP proxy additionally obtains eNB mapping table information from the source TCP proxy.

In Scenario 2, to transmit data of a source eNB UE buffer to a target eNB in fast DL data forwarding, a method for data forwarding between the source TCP proxy and the target TCP proxy is needed. In Scenario 2, a TCP sender and a TCP ACK receiver are different, degrading a transmission rate, and thus a scheme for solving such a problem is required.

Figure 10:
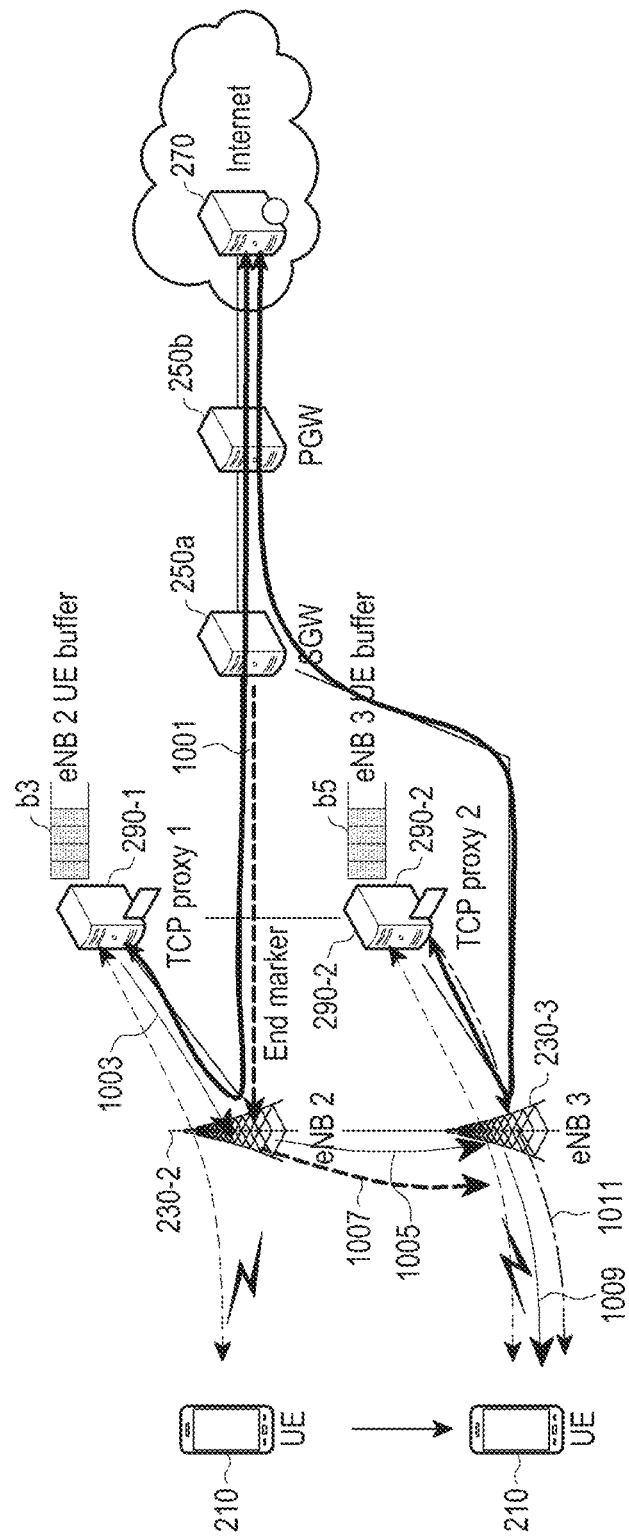
FIG. 10 is a view for describing a DL data reception method in a TCP proxy handover scenario 2 according to an embodiment of the present disclosure.

FIG. 10 is a view for describing a DL data reception method in the TCP proxy handover scenario 2 according to an embodiment of the present disclosure.

Referring to FIG. 10, the TCP proxy 1 290-1 receives IP data of the UE 210 through the eNB 2 230-2 in an eNB 2 UE buffer b3 for the eNB 2 230-2. The eNB 3 230-3, a target eNB to which the UE 210 is to move, is connected with the TCP proxy 2 290-2.

In operation 1001 of FIG. 10, the SGW 250a performs path switching due to a handover and then sends an end marker to the eNB 2 230-2. The SGW 250a then transmits data to the eNB 3 230-3 which then forwards the received data to the TCP proxy 2 290-2 through a proxy tunnel update procedure. The TCP proxy 2 290-2 buffers the data of the UE 210, received through the eNB 3 230-3, in an eNB 3 UE buffer b5 for the eNB 3 230-3. The eNB 2 230-2 receives transmission-controlled IP data of the UE 210 from the TCP proxy 1 290-1 in operation 1003, and forwards the data received from the TCP proxy 1 290-1 to the eNB 3 230-3 in operation 1005. The data forwarded in this way is subject to eNB 2/RAN-based transmission control of the TCP proxy 1 290-1.

In operation 1007, the eNB 2 230-2 forwards an end marker to the eNB 3 230-3 if data transmission from the TCP proxy 1 290-1 is completed. After completing transmission of the data, forwarded from the eNB 2 230-2, to the UE 210 in operation 1009, the eNB 3 230-3 then transmits the data, forwarded from the TCP proxy 2 290-2, to the UE 210 in operation 1011. The data forwarded from the TCP proxy 2 290-2 to the eNB 3 230-3 is subject to eNB 3/RAN-based transmission control. In the embodiment illustrated in FIG. 10, the UE 210 receives data under eNB 2/RAN-based transmission control even after handing over to the eNB 3 230-3. Thus, there is a method for applying transmission control at the right time close to a moving time of the UE 210.

Figure 11:
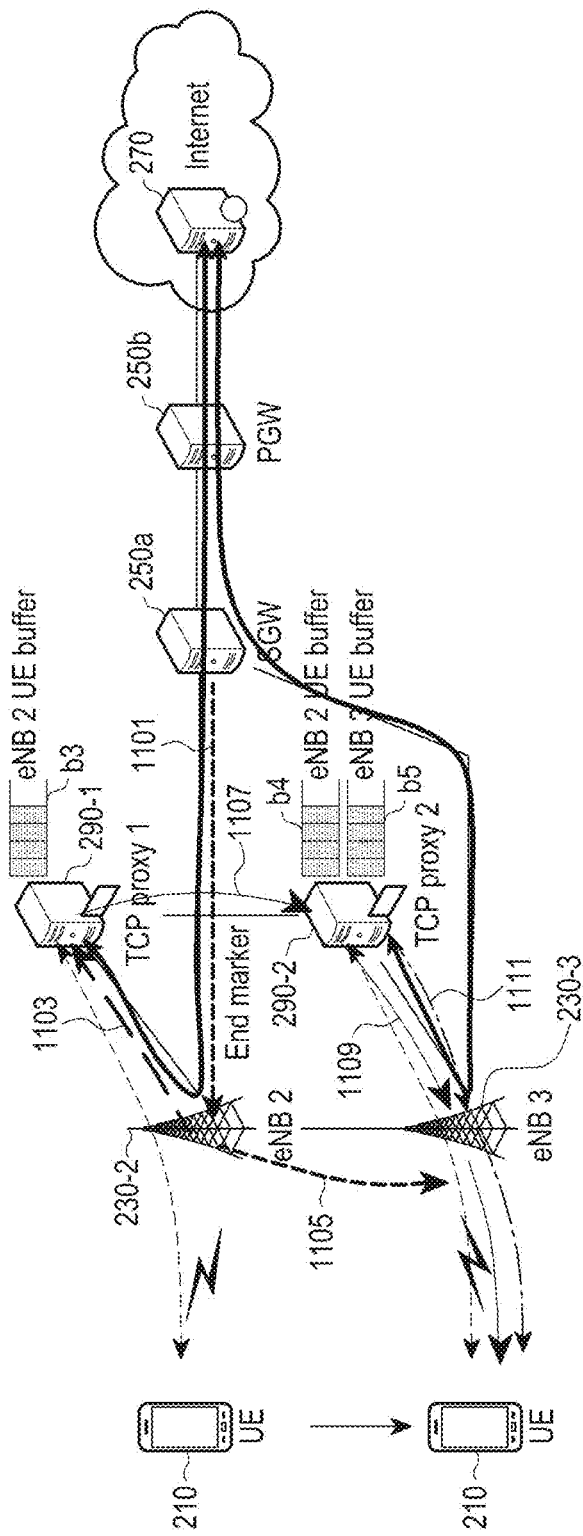
FIG. 11 is a view for describing a DL data reception method using fast DL data forwarding in a TCP proxy handover scenario 2 according to an embodiment of the present disclosure.

FIG. 11 is a view for describing a DL data reception method using fast DL data forwarding in the TCP proxy handover scenario 2 according to an embodiment of the present disclosure.

In an embodiment of FIG. 11, in Scenario 2 where a target eNB is connected to another TCP proxy that is different from a TCP proxy to which a source eNB is connected, the target TCP proxy and the source TCP proxy create a tunnel for transmitting and receiving data there between during a handover procedure. The target TCP proxy creates a UE buffer for receiving data from the source eNB connected with the source TCP proxy through the source TCP proxy.

Referring to FIG. 11, in operation 1101, the SGW 250*a* performs path switching due to a handover and then sends an end marker to the eNB 2 230-2. In operation 1103, the eNB 2 230-2 having received the end marker informs the TCP proxy 1 290-1 of reception of the end marker. In operation 1105, the eNB 2 230-2 forwards the end marker to the eNB 3 230-3. In operation 1107, the TCP proxy 1 290-1 having recognized the reception of the end marker forwards data buffered in the eNB 2 UE buffer b3 for the eNB 2 230-2 to the TCP proxy 2 290-2 which then buffers the forwarded data in an eNB 2 UE buffer b4 for the eNB 2 230-2 in the TCP proxy 2 290-2. In operation 1109, the TCP proxy 2 290-2 transmits data buffered in the eNB 2 UE buffer b4 to the eNB 3 230-3 by applying eNB 3/RAN-based transmission control. In operation 1111, the TCP proxy 2 290-2 transmits data of the eNB 3 UE buffer b5 for the eNB 3 230-3 after transmitting all the data of the eNB 2 UE buffer b4. In the embodiment of FIG. 11, even if the UE 210 is within a coverage of the eNB 3, data of the UE 210 under eNB 2-based transmission control may be subject to eNB 3-based transmission control at the right time according to movement of the UE 210 and may be transmitted to the UE 210.

Figure 12A:
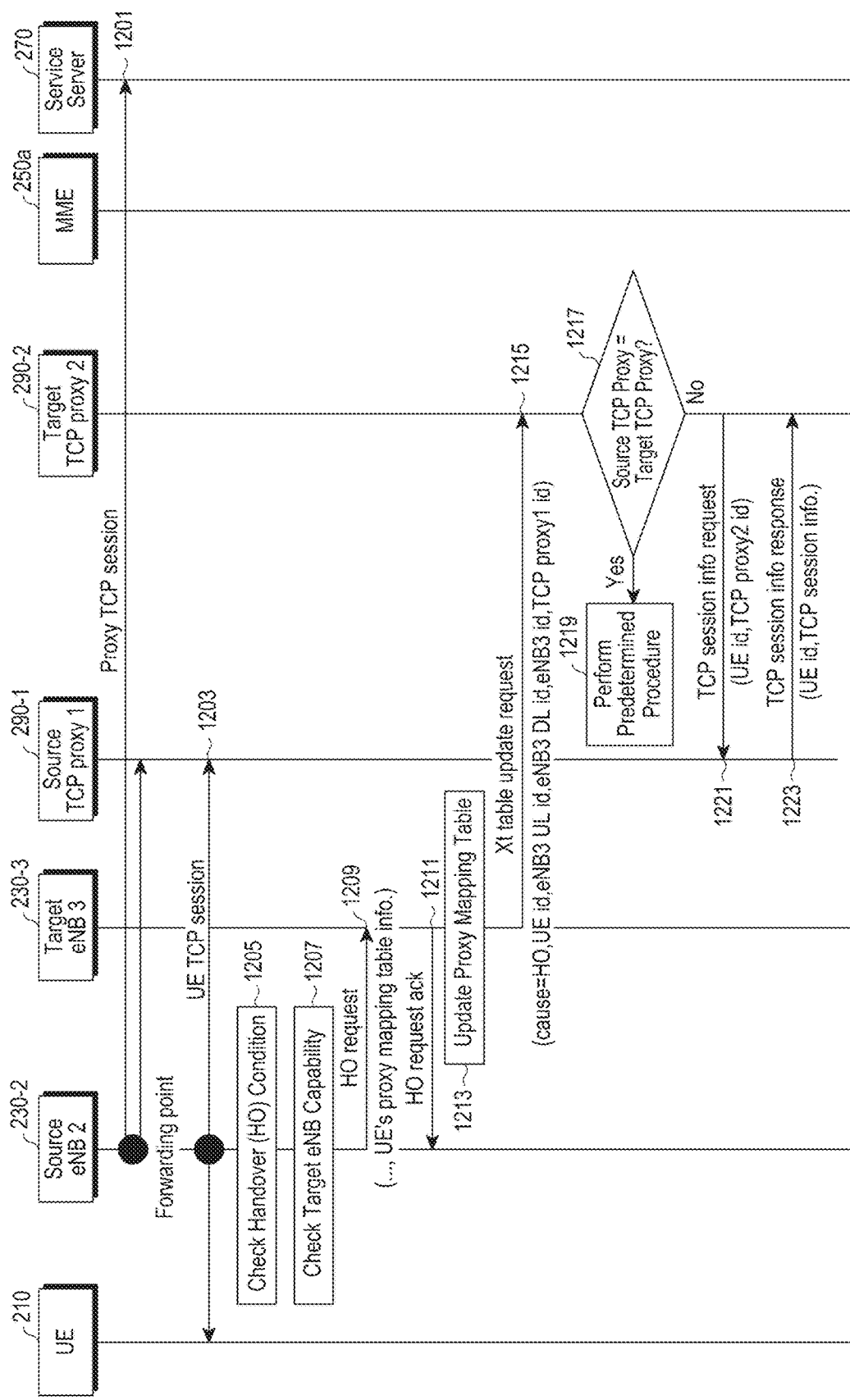
FIGS. 12A through 12C are ladder diagrams of a handover procedure when a TCP proxy handover scenario 2 is applied according to an embodiment of the present disclosure.
Figure 12B:
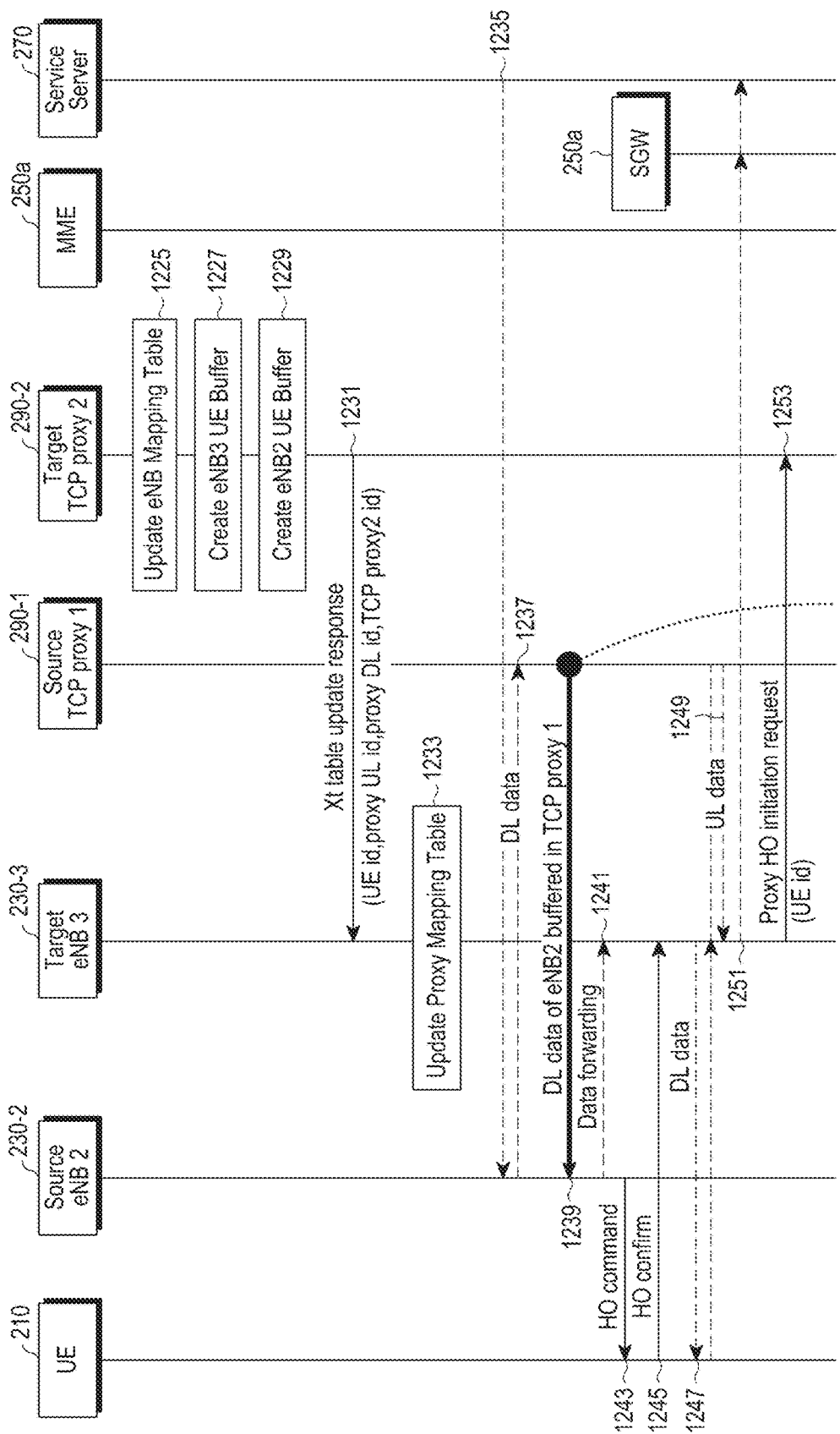
Figure 12C:
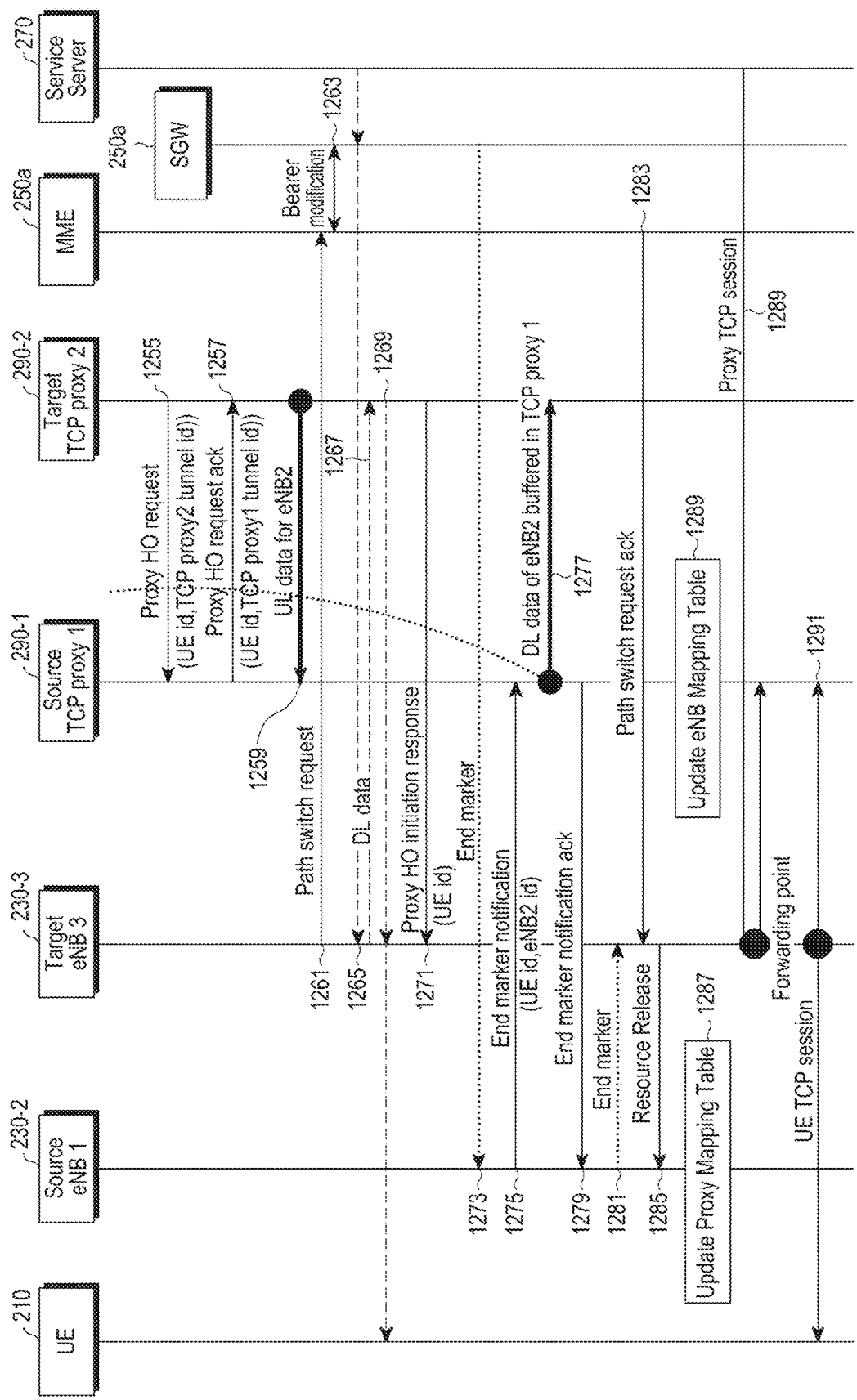

FIGS. 12A through 12C are ladder diagrams of a handover procedure when the TCP proxy handover scenario 2 is applied according to an embodiment of the present disclosure, in which the handover procedure is illustrated for a case when a source eNB and a target eNB are connected to different TCP proxies. In the procedure illustrated in FIGS. 12A through 12C, operations that are the same as or similar to those in the procedure illustrated in FIGS. 9A through 9C will not be described in detail.

In the procedure illustrated in FIGS. 12A through 12C, it would be understood that operations 1217 through 1229 correspond to a TCP session information query procedure, operations 1253 through 1271 correspond to a proxy handover procedure (an inter-proxy tunnel creation procedure), and operations 1275 through 1289 correspond to fast DL data forwarding and an eNB 2 UE buffer removal procedure.

First, as to the TCP session information query procedure, in operation 1217, the target proxy 2 290-2 determines whether the source TCP proxy 1 290-1 and the target TCP proxy 2 290-2 are different by determining whether there is no entry of the UE 210 in an eNB mapping table. In the current embodiment, it is assumed that the source TCP proxy 1 290-1 and the target TCP proxy 2 290-2 are different from each other. If the source TCP proxy 1 290-1 and the target TCP proxy 2 290-2 are the same as each other, a predetermined procedure is performed in operation 1219. The predetermined procedure may be a procedure described later with reference to FIGS. 9A through 9C. In operation 1221, the TCP proxy 2 290-2 sends a TCP session info request (including UE id and TCP proxy2 id) to the TCP proxy 1 290-1. In operation 1223, the TCP proxy 2 290-1 sends a TCP session info response (including UE id and TCP session information) to the TCP proxy 2 290-2. In operation 1229, the TCP proxy 2 290-2 creates an eNB 2 UE buffer for buffering data received from the TCP proxy 1 290-1. In the TCP session information query procedure, to obtain split TCP session information managed by the source TCP proxy, the TCP proxy 2 290-2 obtains eNB mapping table information from the TCP proxy 1 290-1 and creates the eNB 2 UE buffer.

As to the proxy handover procedure (the inter-proxy tunnel creation procedure), the eNB 3 230-3 having received an HO confirm message from the UE 210 sends a proxy HO initiation request (including UE id) to the TCP proxy 2 290-2 in operation 1253. The TCP proxy 2 290-2 having received the proxy HO initiation request sends a proxy HO request (including UE id and TCP proxy2 tunnel id) to the TCP proxy 1 290-1 to create a tunnel for transmitting and receiving data to and from the TCP proxy 1 290-1, in operation 1255. 'TCP proxy 2 tunnel id' is an identity for identifying a tunnel used to transmit data of the UE 210 in the TCP proxy 2 290-2. In operation 1257, the TCP proxy 1 290-1 sends a proxy HO request ack (including UE id and TCP proxy1 tunnel id) to the TCP proxy 2 290-2. 'TCP proxy 1 tunnel id' is an identity for identifying a tunnel used to transmit data of the UE 210 in the TCP proxy 1 290-1. In operation 1261, the TCP proxy 2 290-2 sends a proxy HO initiation response (including UE id) to the eNB 3 230-3. Through the above-described proxy handover procedure (the inter-proxy tunnel creation procedure), the TCP proxy 1 290-1 and the TCP proxy 2 290-2 may transmit and receive data there between.

As to fast DL data forwarding and the eNB 2 UE buffer removal procedure, the eNB 1 230-1 sends an end marker notification (including UE id and eNB2 id) to the TCP proxy 1 290-1 in operation 1275. In operation 1277, the TCP proxy 1 290-1 having received the end marker notification forwards DL data buffered in the eNB 2 UE buffer in the TCP proxy 1 290-1 to the TCP proxy 2 290-2. The TCP proxy 1 290-1 sends an end marker notification ack to the eNB 1 230-1 in operation 1279, and updates an eNB mapping table by removing an entry of the UE 210 in operation 1289.

As can be seen in common from the embodiment of FIGS. 9A through 9C and the embodiment of FIGS. 12A through 12C, even after the UE moves to the target eNB in the handover, the DL data buffered in the source TCP proxy may be forwarded to the UE through data forwarding of the source eNB. However, the same does not go for UL data. In the LTE system, immediately after the UE sends the HO confirm message to the target eNB, the UL data is transmitted to the service server through the target eNB.

Figure 13:
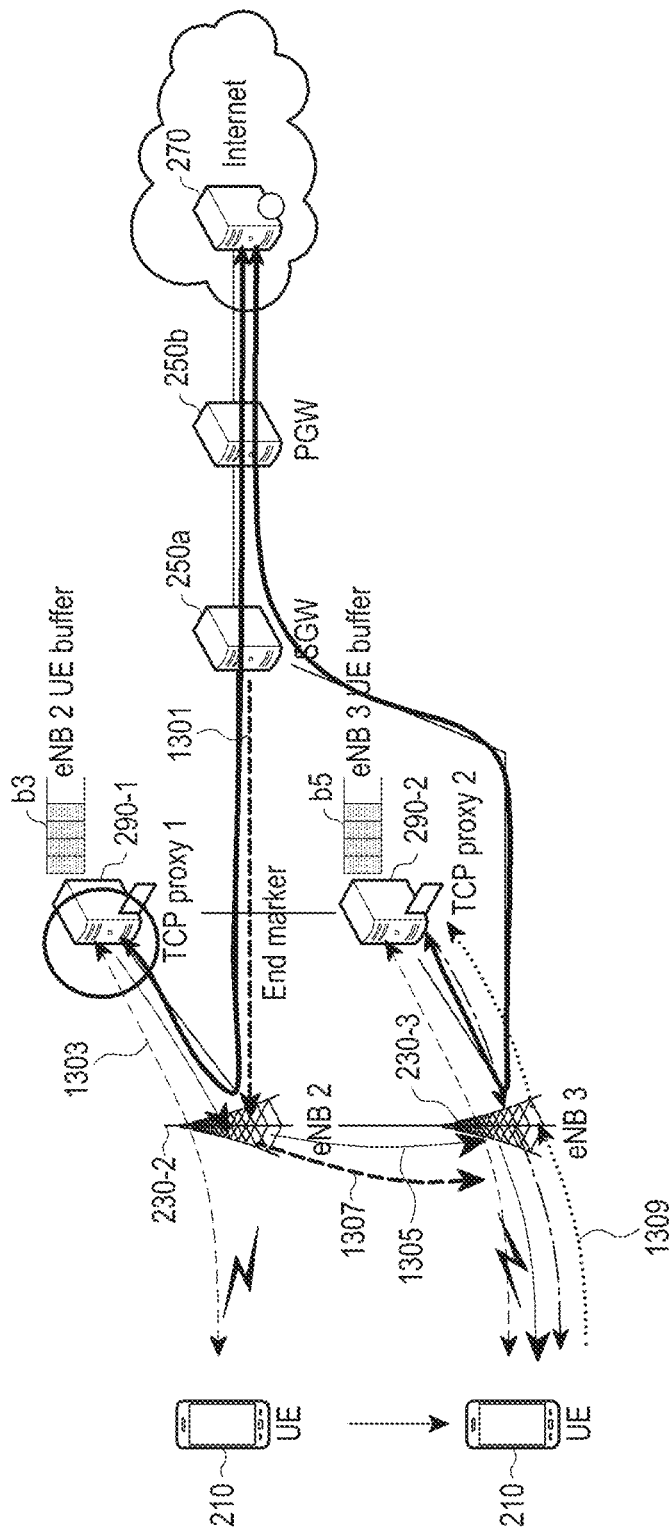
FIG. 13 is a view for describing a UL data transmission method in a TCP proxy handover scenario 1 according to an embodiment of the present disclosure.

FIG. 13 is a view for describing a UL data transmission method in the TCP proxy handover scenario 1 according to an embodiment of the present disclosure, in which operations 1301 through 1307 of FIG. 13 are the same as DL data reception operations described in FIG. 10 and thus will not be described in detail.

Referring to FIG. 13, in a structure where the source TCP proxy 1 290-1 and the target TCP proxy 2 290-2 are different from each other, the UE 210, even after moving to the target eNB 230-3, receives DL data transmitted from the source TCP proxy 1 290-1 through data forwarding. For example, it is assumed that the source TCP proxy 1 290-1 transmits DL data #1 through #5 based on data forwarding through the source eNB 230-2, and the target TCP proxy 2 290-2 transmits DL data #6 and subsequent DL data. The UE 210 completes a handover to the target eNB 230-3 during reception of the DL data #1 through #5. Immediately after the handover, the UE 210 transmits UL data to the target eNB 230-3, such that TCP ACK with respect to the DL data #1 through #5, sent by the UE 210, is forwarded to the target TCP proxy 2 290-2 as in operation 1309 of FIG. 13. In this case, TCP data sender and receiver are different, and the TCP proxy 1 290-1, the TCP sender, determines a TCP ACK loss and determines retransmission. If TCP retransmission is performed, a TCP window size is reduced, degrading a transmission rate.

Figure 14:
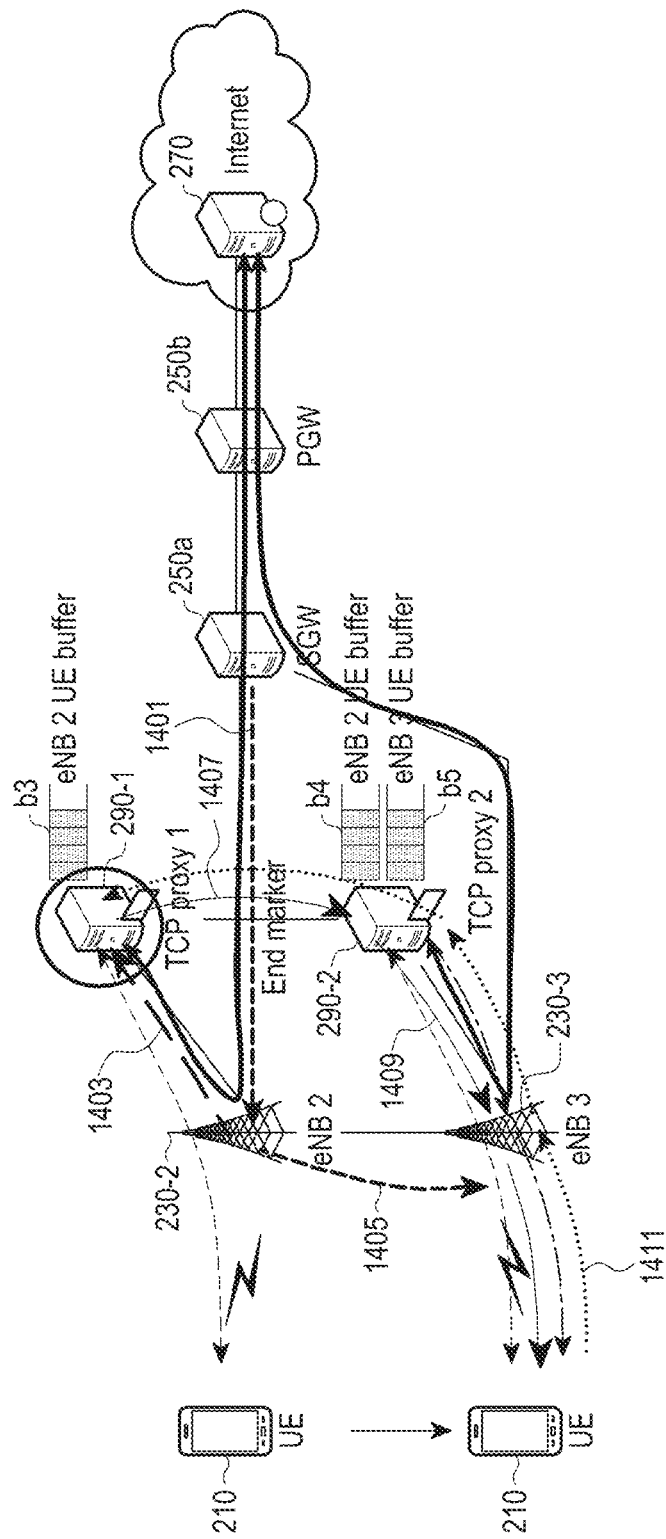
FIG. 14 is a view for describing a DL data transmission method using fast UL data forwarding in a TCP proxy handover scenario 2 according to an embodiment of the present disclosure.

FIG. 14 is a view for describing a DL data transmission method using fast UL data forwarding in the TCP proxy handover scenario 2 according to an embodiment of the present disclosure. Operations 1401 through 1409 of FIG. 14 are the same as the DL data reception method described with reference to FIG. 11, and thus will not be described in detail.

Referring to FIG. 14, the TCP proxy 2 290-2 receives forwarded split TCP session information through the handover procedure. Upon receiving UL data from the UE 210, the TCP proxy 2 290-2 forwards ACK with respect to TCP data transmitted by the TCP proxy 1 290-1 to the TCP proxy 1 290-1 based on the split TCP session information of the eNB mapping table, in operation 1411. The UL data forwarding is the same as the transmission path of operations 1249 and 1251 of FIG. 12B.

Scenario 3) when a Source eNB is Connected to a TCP Proxy, but a Target eNB is a Legacy eNB that is not Connected with the TCP Proxy.

In Scenario 3, when the UE 210 using a split TCP session through a TCP proxy moves to a legacy eNB having no connection with the TCP proxy, connection with the TCP proxy having the split TCP session is torn down.

Figure 15A:
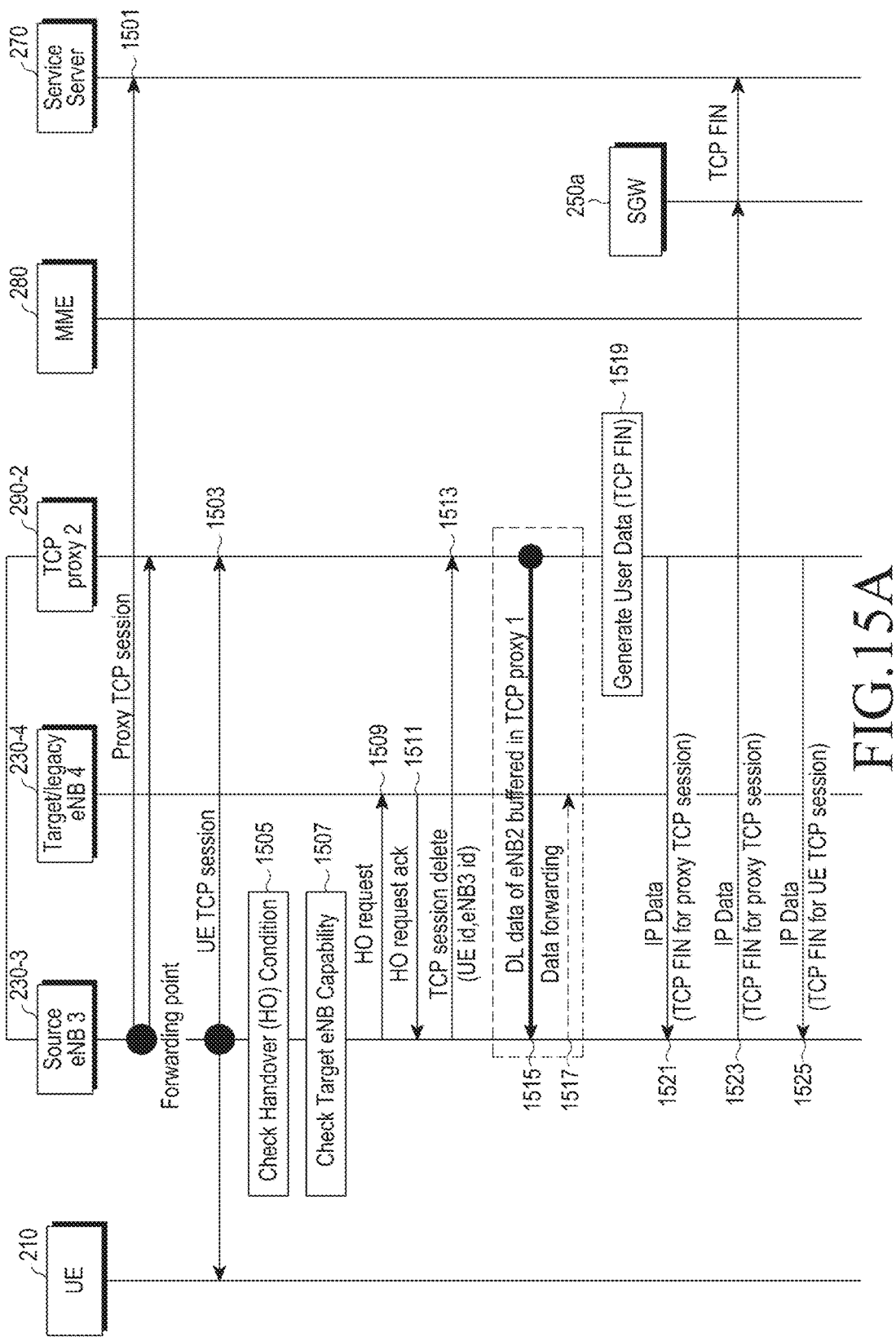
FIGS. 15A and 15B are ladder diagrams of a handover procedure when a TCP proxy handover scenario 3 is applied according to an embodiment of the present disclosure.
Figure 15B:
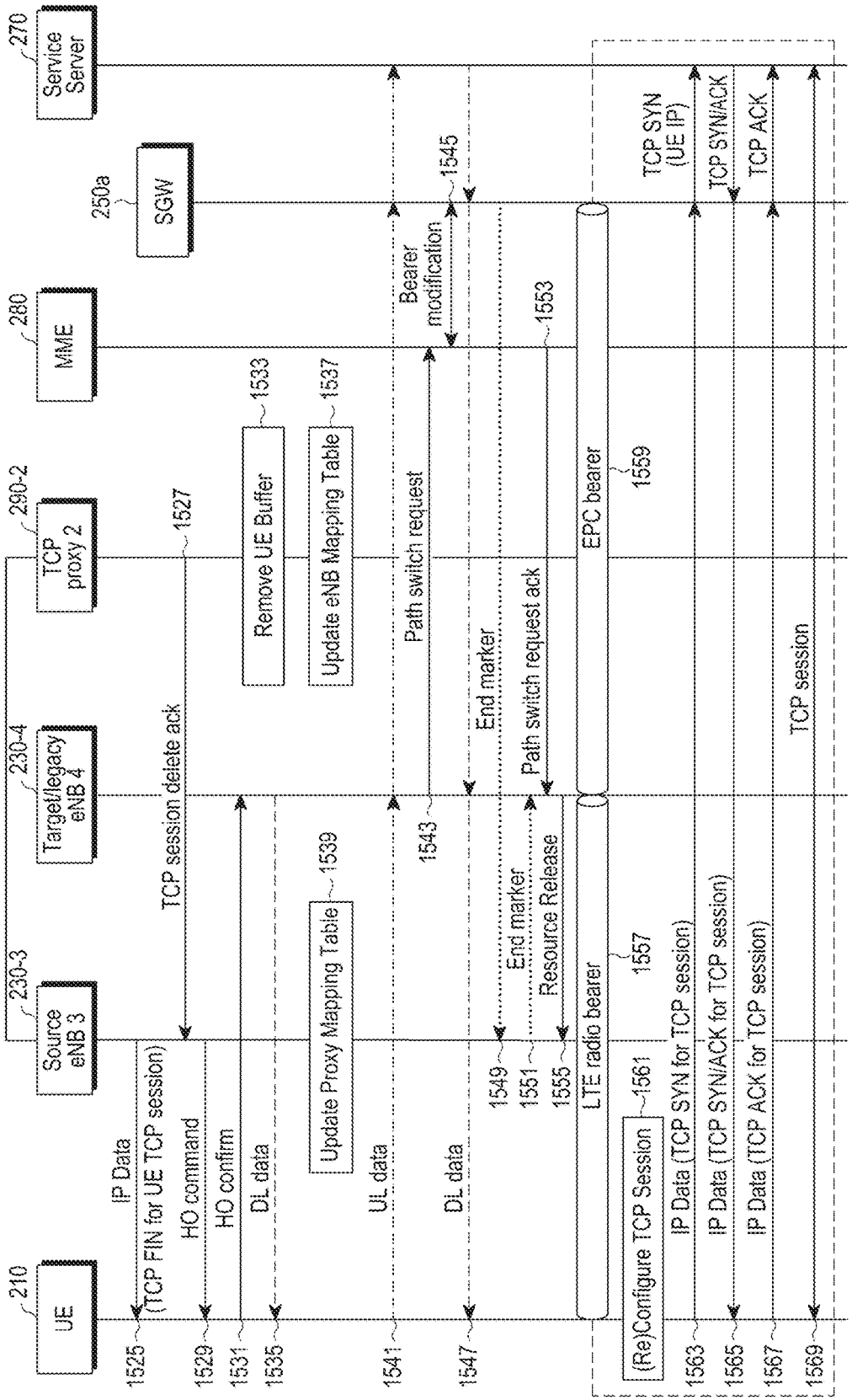

FIGS. 15A and 15B are ladder diagrams of a handover procedure when the TCP proxy handover scenario 3 is applied according to an embodiment of the present disclosure, in which the handover procedure is illustrated for a case when the UE 210 hands over to the legacy eNB. In Scenario 3, a split TCP session deletion procedure is performed. The split TCP session deletion procedure is performed through the above-described TCP teardown procedure.

Referring to FIGS. 15A and 15B, in operation 1513, the eNB 3 230-3 sends a TCP session delete message (including UE id and eNB3 id) to the TCP proxy 2 290-2. The TCP proxy 2 290-2 transmits DL data buffered therein to the eNB 3 230-3 in operation 1515, and the eNB 3 230-3 transmits the DL data to the eNB 4 230-4 in operation 1517. Data forwarding of operation 1517 from the TCP proxy 2 290-2 to the eNB 2 230-2 (not shown) through the eNB 3 230-3 may be omitted. The TCP proxy 2 290-2 generates TCP Finish (FIN) data for tearing down the split TCP session in operation 1519, and tears down the proxy TCP session by transmitting the generated TCP FIN data to the service server 270 through the eNB 3 230-3 in operations 1521 and 1523. In operation 1525, the TCP proxy 2 290-2 tears down the UE TOP session by transmitting the generated TCP FIN to the UE 210. In operation 1527, the TCP proxy 2 290-2 informs the eNB 3 230-3 of teardown (or release) of the split TCP session by sending a TCP session delete ack to the Enb 3 230-3. The Enb 3 230-3 and the TCP proxy 2 290-2 remove buffers and mapping tables for the UE 210 in operations 1533 and 1537. In the embodiment of FIGS. 15A and 15B, if the UE moves to the legacy Enb, an application has to (re)configure the TCP session for connection with the service server as in operation 1561 because the TCP proxy arbitrarily tears down the TCP session used by the UE. This may be performed by a function of the application. In the embodiment of FIGS. 15A and 15B, operations that are not directly related to the split TCP session deletion procedure will not be described.

Scenario 4) when a Source Enb is a Legacy Enb and a Target Enb is Connected with a TCP Proxy.

Referring to FIG. 6, when the UE 210 in a coverage of the legacy eNB 230-4 moves to the target eNB 230-5 having a connection with the TCP proxy 3 290-3, a used TCP session maintains a state of connection with the service server 270 and a split TCP session is created for a newly created TCP session. To this end, in a handover procedure of the UE 210, the target eNB 230-5 performs TCP proxy preparation to create a proxy tunnel.

Figure 16A:
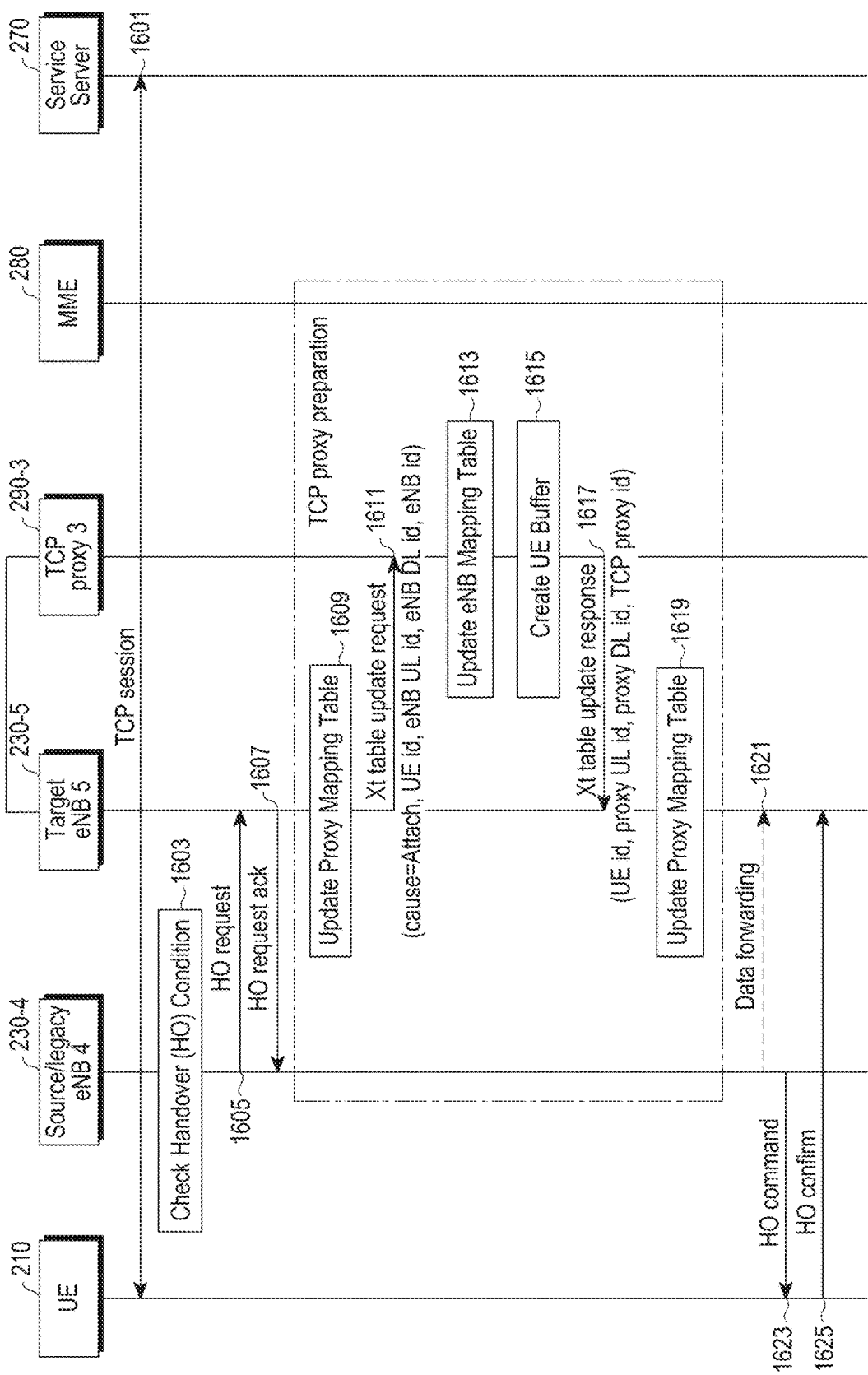
FIGS. 16A and 16B are ladder diagrams of a handover procedure when a TCP proxy handover scenario 4 is applied according to an embodiment of the present disclosure.
Figure 16B:
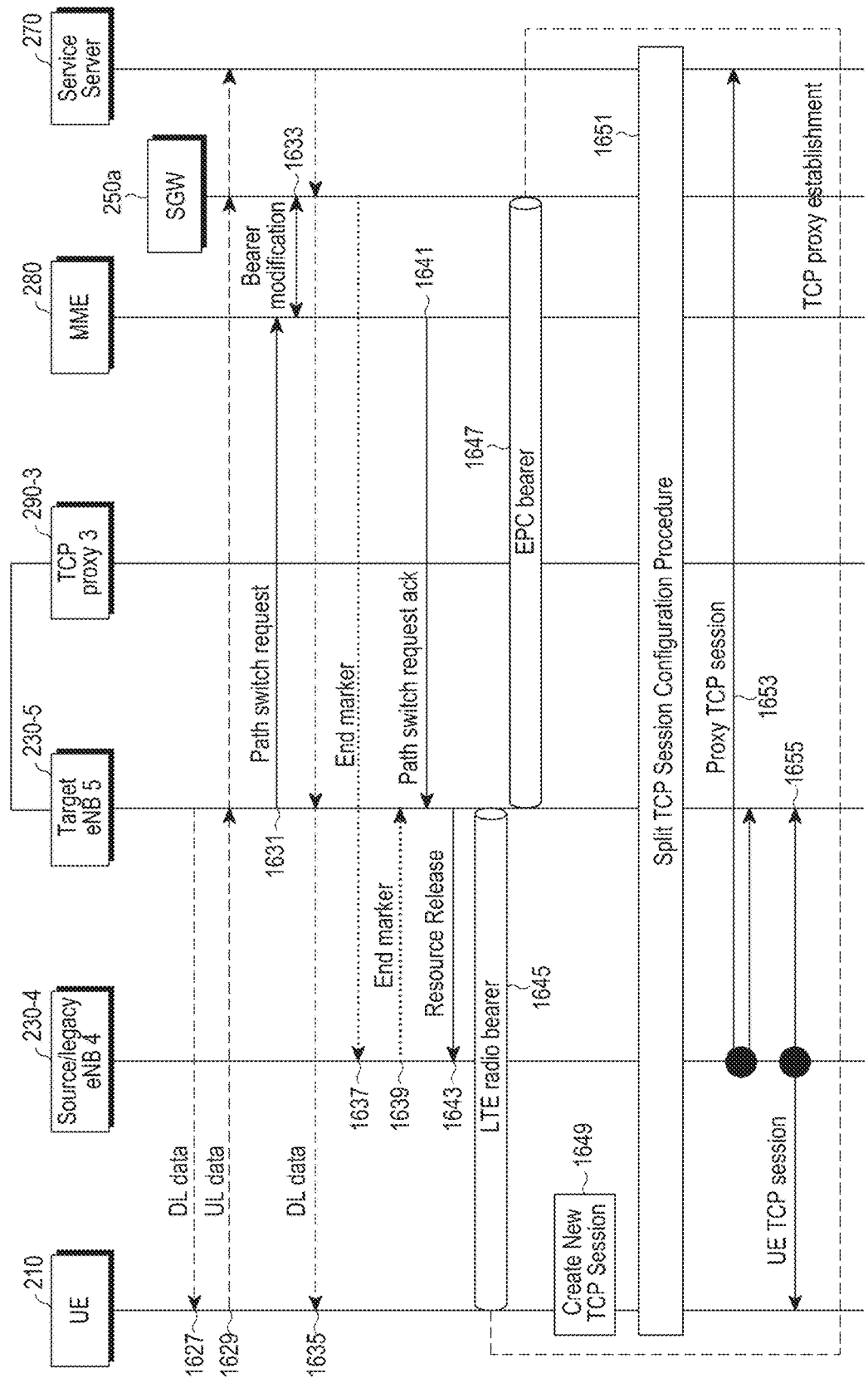

FIGS. 16A and 16B are ladder diagrams of a handover procedure when the TCP proxy handover scenario 4 is applied according to an embodiment of the present disclosure, in which the handover procedure is illustrated for a case when the UE 210 in a coverage of the legacy eNB 23-4 moves to the eNB 230-5 having a connection with the TCP proxy 290-3. Operations 1609 through 1619 of FIGS. 16A and 16B correspond to the TCP proxy preparation process that is the same as the TCP proxy preparation process described with reference to FIGS. 5A through 5C, and thus will not be described in detail. After the TCP proxy preparation process is performed, if the UE 210 creates a new TCP session in operation 1649, a TCP session split through the TCP proxy 3 290-3 is configured in operation 1651. The split TCP session configuration procedure is the same as that described with reference to FIGS. 5A through 5C, and thus will not be described in detail.

Figure 17:
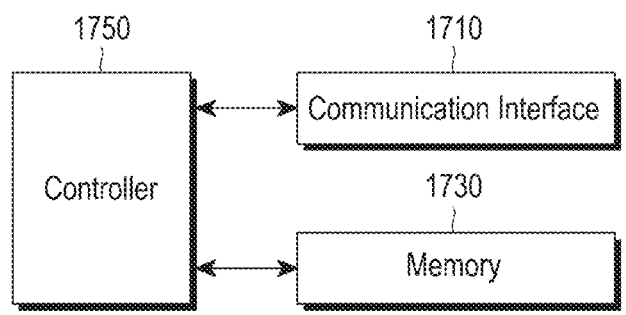
FIG. 17 is a block diagram of a structure that is applicable to a TCP proxy, an eNB, and a UE in a communication system according to an embodiment of the present disclosure.

FIG. 17 is a block diagram of a structure that is applicable to a TCP proxy, an eNB, and a UE in a communication system according to an embodiment of the present disclosure, in which the structure illustrated in FIG. 17 may include a communication interface 1710, a memory 1730, and a controller 1750. The communication interface 1710 is used for communication with at least one of a wireless network and a wired network. The memory 130 may include at least one buffer for buffering data transmitted and received through a network. The controller 1750 controls the entire structure to perform split TCP session configuration and handover-related operations according to schemes described in the embodiments illustrated in FIGS. 2 through 16B.

The invention claimed is:
1. A method for establishing a transmission control protocol (TCP) connection by a TCP proxy in a communication system, the method comprising:
establishing a proxy tunnel between the TCP proxy and a base station for transmitting and receiving data to and from the base station, based on a radio bearer information and evolved packet core (EPC) bearer information;
establishing a first TCP connection between a user equipment (UE) and the TCP proxy and a second TCP connection between the TCP proxy and a service server, in response to a TCP connection request from the UE, the first TCP connection related to a radio bearer, and the second TCP connection related to a EPC bearer; and performing transmission control with respect to the first TCP connection based on a change of a channel state of a wireless network provided from the base station.

2. The method of claim 1, further comprising:
receiving information indicating the channel state from the base station.

3. The method of claim 1, wherein the TCP proxy transmits and receives internet protocol (IP)-based uplink (UL) data or IP-based downlink (DL) data to and from the base station through the proxy tunnel.

4. The method of claim 3, wherein the TCP proxy stores a mapping table for establishing the proxy tunnel, wherein the proxy tunnel comprises a UL tunnel and a DL tunnel, and wherein the mapping table comprises identity information for identifying the UL tunnel and the DL tunnel.

5. The method of claim 4, further comprising:
updating the mapping table by modifying the identity information in the mapping table, if the UE performs handover to another base station.

6. The method of claim 4, wherein the UL tunnel is mapped to the radio bearer information, and wherein the DL tunnel is mapped to the EPC bearer information.

7. The method of claim 1, further comprising:
determining whether to split a TCP connection between the UE and the service server into the first TCP connection and the second TCP connection, according to a predetermined TCP policy.

8. A transmission control protocol (TCP) proxy device for configuring a TCP connection in a communication system, the TCP proxy device comprising:
a communication interface configured for communication with a base station; and
a controller configured to:
establish a proxy tunnel between the TCP proxy and a base station for transmitting and receiving data to and from the base station, based on a radio bearer information and evolved packet core (EPC) bearer information,
establish a first TCP connection between a user equipment (UE) and the TCP proxy device and a second TCP connection between the TCP proxy device and a service server, in response to a TCP connection request from the UE, the first TCP connection related to a radio bearer, and the second TCP connection related to a EPC bearer, and
perform transmission control with respect to the first TCP connection based on a change of a channel state of a wireless network, provided from the base station.

9. The method of claim 1, further comprising:
transmitting the data to the base station, based on a transmission delay, to maintain a buffer size of the UE.

10. The TCP proxy device of claim 8, wherein the controller is further configured to:
transmit the data to the base station, based on a transmission delay, to maintain a buffer size of the UE.

11. The TCP proxy device of claim 8, wherein the controller is further configured to:
receive information indicating the channel state from the base station.

12. The TCP proxy device of claim 8, wherein the TCP proxy transmits and receives internet protocol (IP)-based uplink (UL) data or IP-based downlink (DL) data to and from the base station through the proxy tunnel.

13. The TCP proxy device of claim 12, wherein the controller is further configured to:
store a mapping table for establishing the proxy tunnel, wherein the proxy tunnel comprises a UL tunnel and a DL tunnel, and
wherein the mapping table comprises identity information for identifying the UL tunnel and the DL tunnel.

14. The TCP proxy device of claim 13, wherein the controller is further configured to:
update the mapping table by modifying the identity information in the mapping table, if the UE performs handover to another base station.

15. The TCP proxy device of claim 8, wherein the controller is further configured to:
determine whether to split a TCP connection between the UE and the service server into the first TCP connection and the second TCP connection, according to a predetermined TCP policy.

16. The TCP proxy device of claim 15, wherein the controller is further configured to:
determine whether to release the split TCP connection, if the UE performs handover to another base station having no connection with the TCP proxy.

* * * * *